(12) United States Patent
Droessler

(10) Patent No.: US 12,071,361 B2
(45) Date of Patent: Aug. 27, 2024

(54) METHOD AND APPARATUS OF MANUFACTURING GLASS PRODUCTS

(71) Applicant: NIPRO CORPORATION, Osaka (JP)

(72) Inventor: Michael Droessler, Gehrden (DE)

(73) Assignee: NIPRO CORPORATION, Osaka (JP)

( * ) Notice: Subject to any disclaimer, the term of this patent is extended or adjusted under 35 U.S.C. 154(b) by 349 days.

(21) Appl. No.: 16/956,714

(22) PCT Filed: Dec. 21, 2018

(86) PCT No.: PCT/JP2018/047206
§ 371 (c)(1),
(2) Date: Jun. 22, 2020

(87) PCT Pub. No.: WO2019/124542
PCT Pub. Date: Jun. 27, 2019

(65) Prior Publication Data
US 2021/0363048 A1 Nov. 25, 2021

(30) Foreign Application Priority Data
Dec. 22, 2017 (DE) .......... 102017011991.0

(51) Int. Cl.
  C03B 23/045 (2006.01)
  C03B 23/09 (2006.01)
  C03B 40/00 (2006.01)

(52) U.S. Cl.
  CPC .......... *C03B 23/045* (2013.01); *C03B 23/092* (2013.01); *C03B 23/095* (2013.01); *C03B 40/00* (2013.01)

(58) Field of Classification Search
  None
  See application file for complete search history.

(56) References Cited

U.S. PATENT DOCUMENTS 1,631,633 A * 6/1927 Hanford .................. C03B 9/344
                                                   249/112
2,306,163 A   12/1942 E. Greifendorf
(Continued)

FOREIGN PATENT DOCUMENTS

CN    201501826    6/2010
DE    2 257 453    10/1973
(Continued)

OTHER PUBLICATIONS

JP 07-215724 machine translation, Haino Kazuyoshi, Carbon Jig for Molding Glass, Aug. 1995 (Year: 1995).*
(Continued)

*Primary Examiner* — Queenie S Dehghan
(74) *Attorney, Agent, or Firm* — Wenderoth, Lind & Ponack, L.L.P.

(57) ABSTRACT

Provided is a method of manufacturing a glass product including the following steps. An intermediate glass product is provided. A portion of the intermediate glass product is heated to a predetermined temperature. A tool and the heated portion of the intermediate glass product are brought into contact. Under a state that a tool contacts the heated portion, at least one of the tool and the intermediate glass product is rotated so that the tool and the intermediate glass product relatively rotate, wherein a part of the tool that contacts the heated portion comprises or is made of glassy carbon.

13 Claims, 20 Drawing Sheets

(56) References Cited

U.S. PATENT DOCUMENTS

| | | | |
|---|---|---|---|
| 2,935,819 A | 5/1960 | Dichter | |
| 3,222,157 A | 12/1965 | Dichter | |
| 3,337,946 A * | 8/1967 | Anderson | F16B 37/068 |
| | | | 29/520 |
| 3,833,347 A | 9/1974 | Angle et al. | |
| 3,900,328 A | 8/1975 | Parsons et al. | |
| 3,979,196 A | 9/1976 | Frank et al. | |
| 4,073,654 A | 2/1978 | Wu | |
| 5,762,673 A | 6/1998 | Hirota et al. | |
| 2003/0170583 A1 * | 9/2003 | Nakashima | H01L 21/67309 |
| | | | 432/247 |
| 2006/0267250 A1 | 11/2006 | Gerretz et al. | |
| 2016/0107918 A1 | 4/2016 | Delgado Carranza | |
| 2018/0244555 A1 * | 8/2018 | Wittland | C03B 20/00 |
| 2019/0161383 A1 * | 5/2019 | Deneka | C03B 29/025 |

FOREIGN PATENT DOCUMENTS

| | | | |
|---|---|---|---|
| DE | 10 2015 117 215 | 4/2017 | |
| EP | 1266871 A2 * | 12/2002 | C03B 23/0013 |
| EP | 1 923 359 | 5/2008 | |
| JP | 2002-121043 | 4/2002 | |
| JP | 2008-150225 | 7/2008 | |

OTHER PUBLICATIONS

JP 2527666 machine translation, Obata Masaaki, Glassy Carbon Coated Article, Aug. 1996 (Year: 1996).*
JP 2006248798 machine translation, Saito Hiroyuki et al., Method for producing silica glass product, Sep. 2006 (Year: 2006).*
JP 20000-007353 machine translation, Nishida Yasuo, Finishing mold device for bottle making machine, Jan. 2000 (Year: 2000).*
Extended European Search Report issued Jul. 20, 2021 in European Patent Application No. 18890976.6.
International Search Report issued Mar. 12, 2019 in International (PCT) Application No. PCT/JP2018/047206.

* cited by examiner

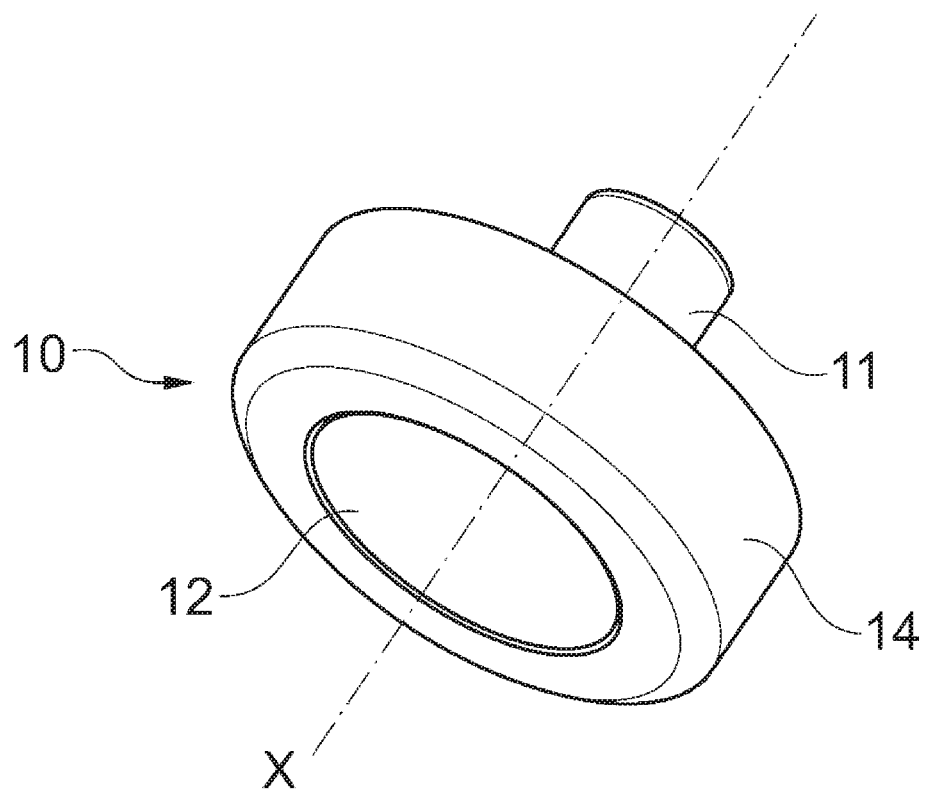
[Fig. 1]

[Fig. 2]
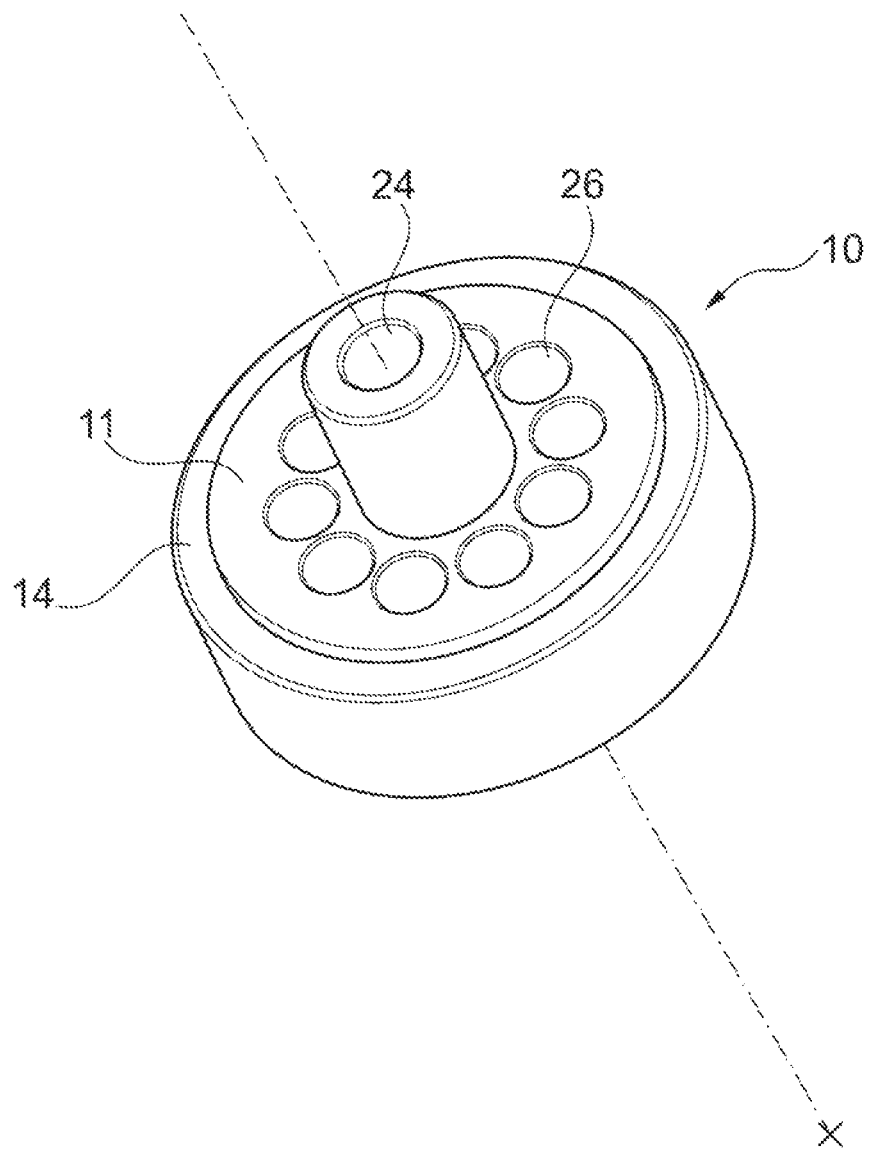

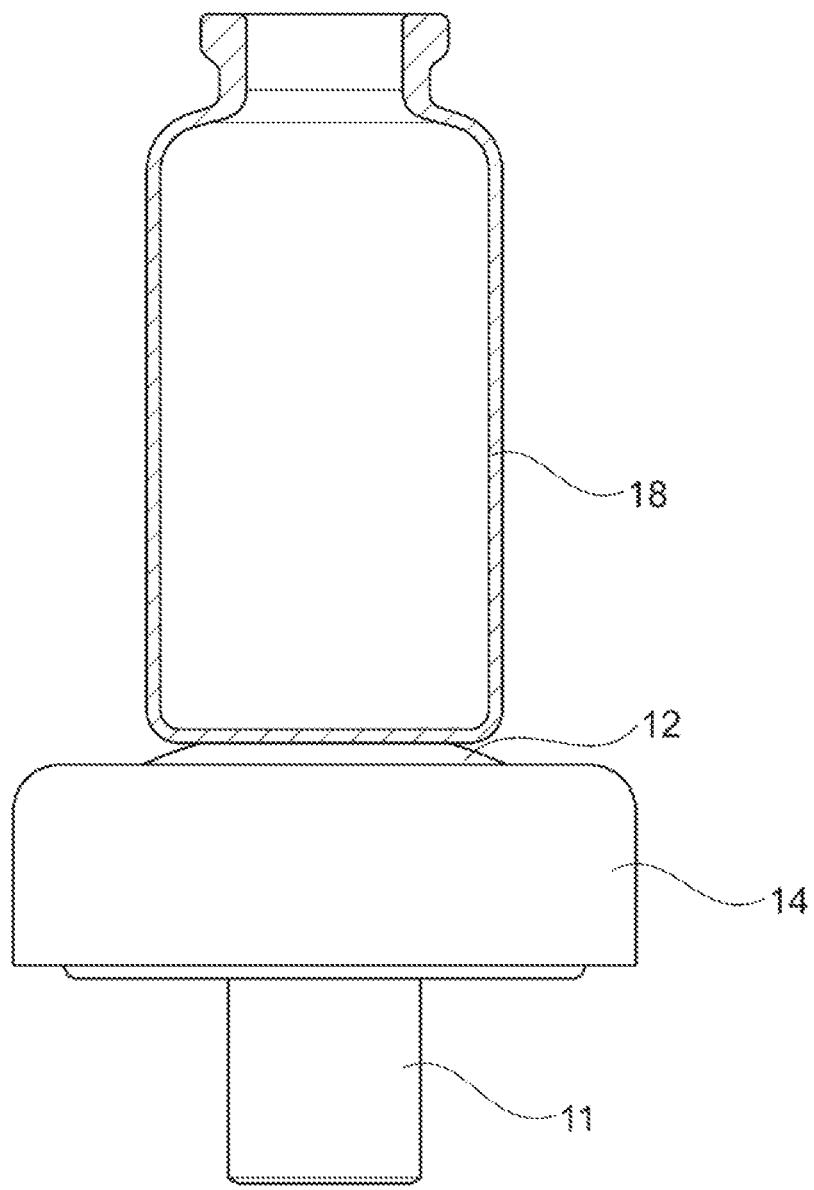
[Fig. 3A]

[Fig. 3B]
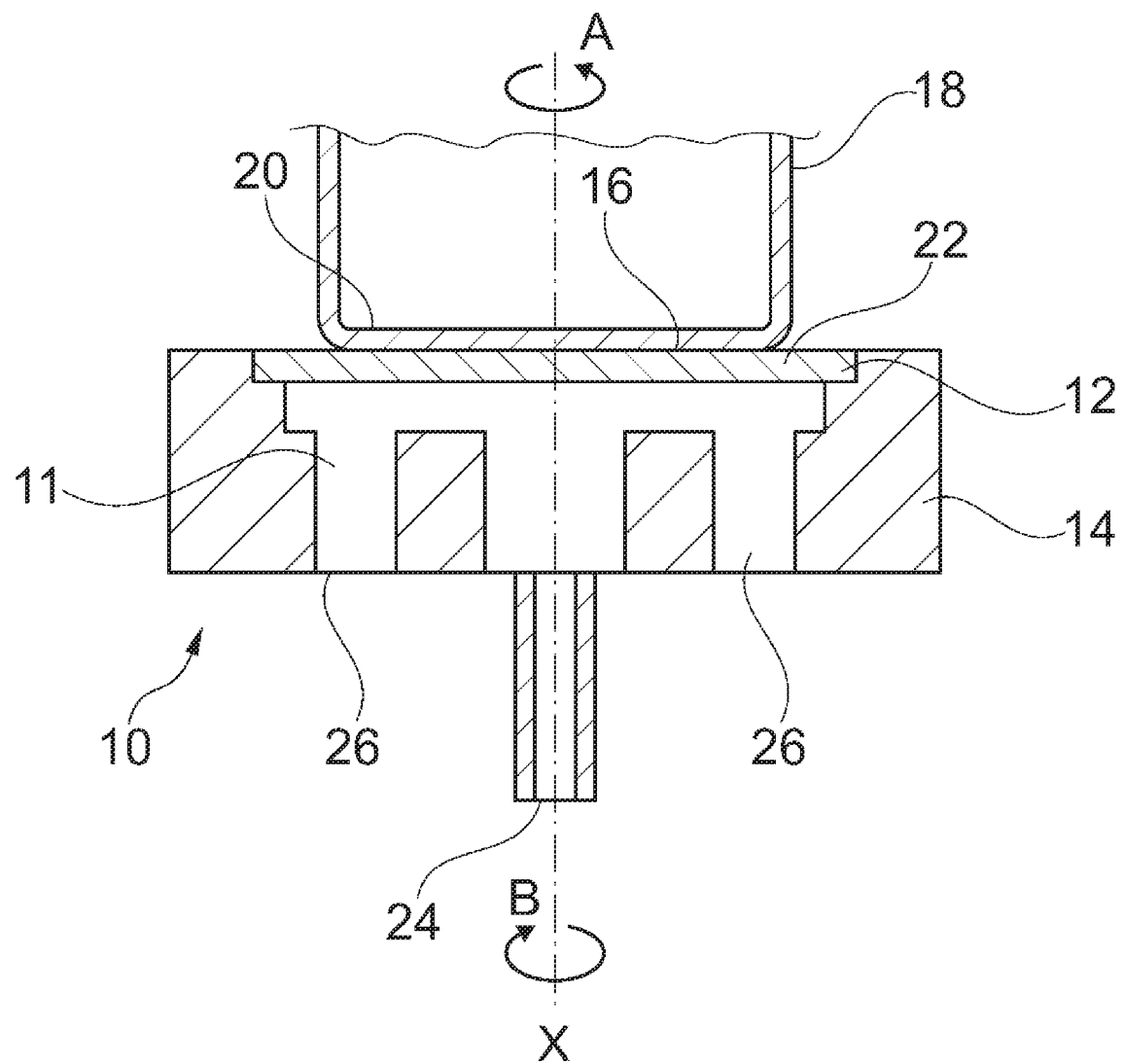

[Fig. 4]
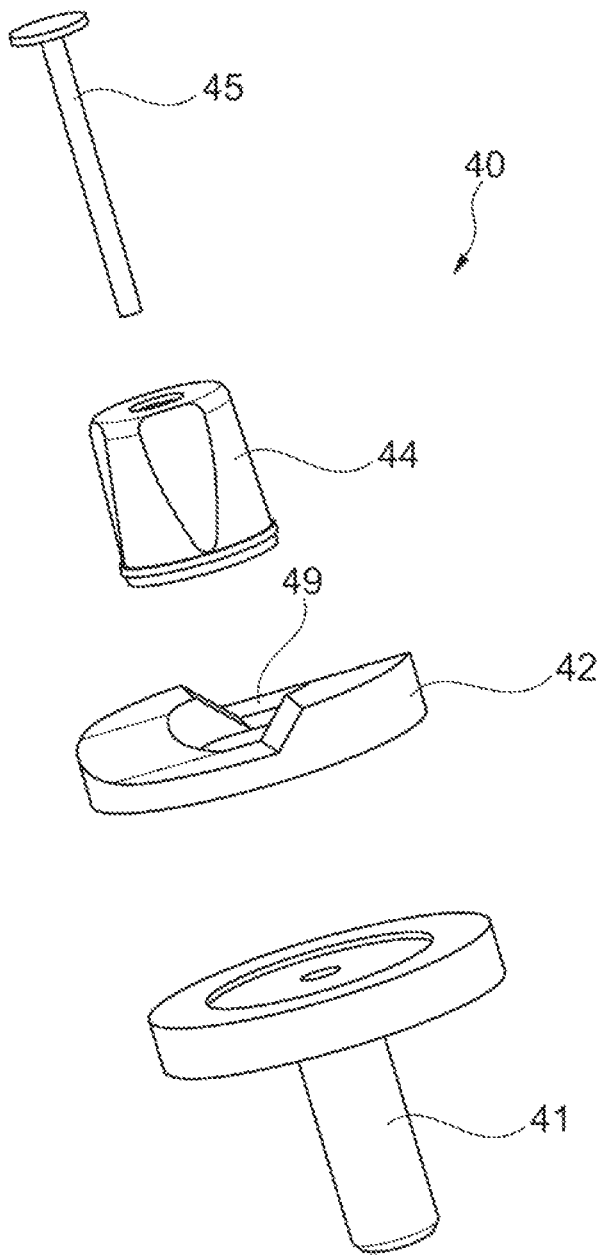

[Fig. 5]
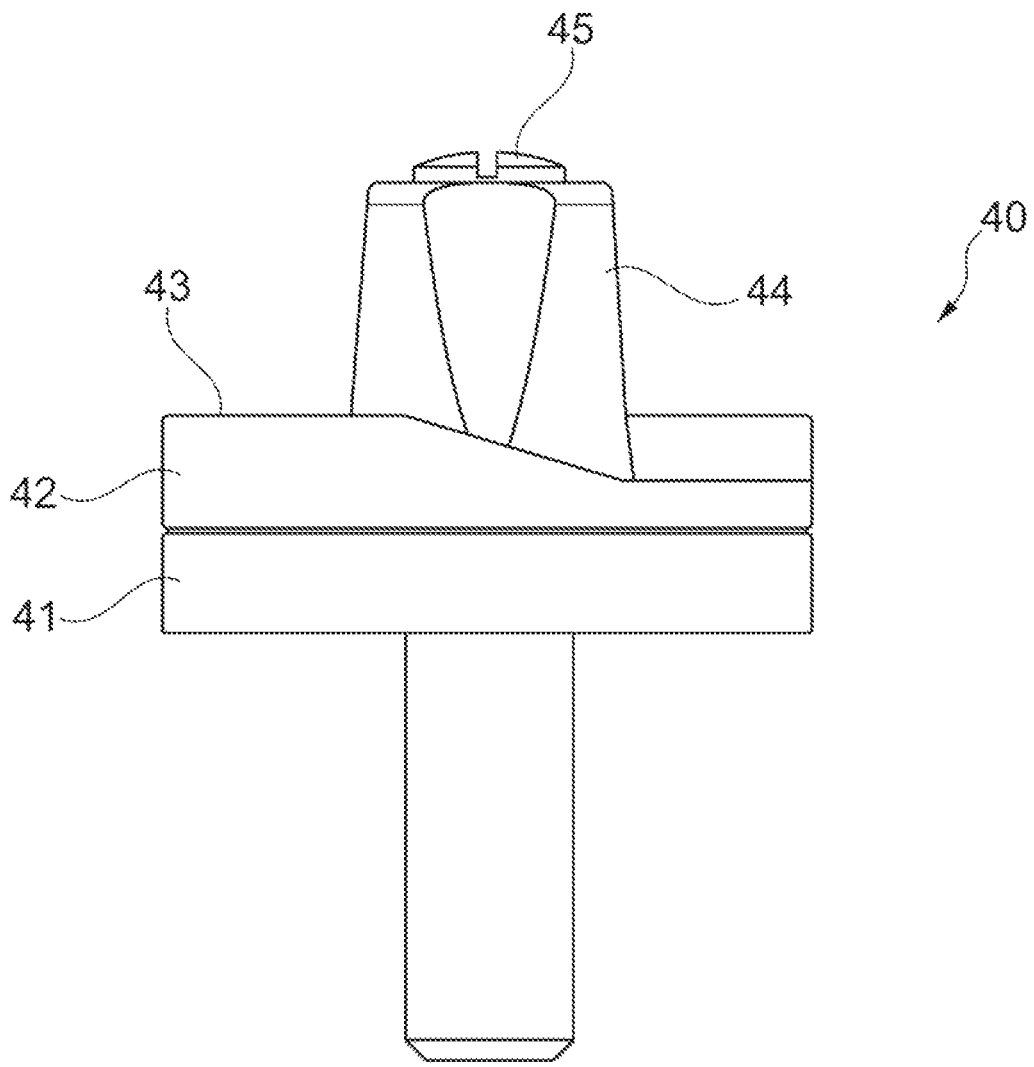

[Fig. 6]
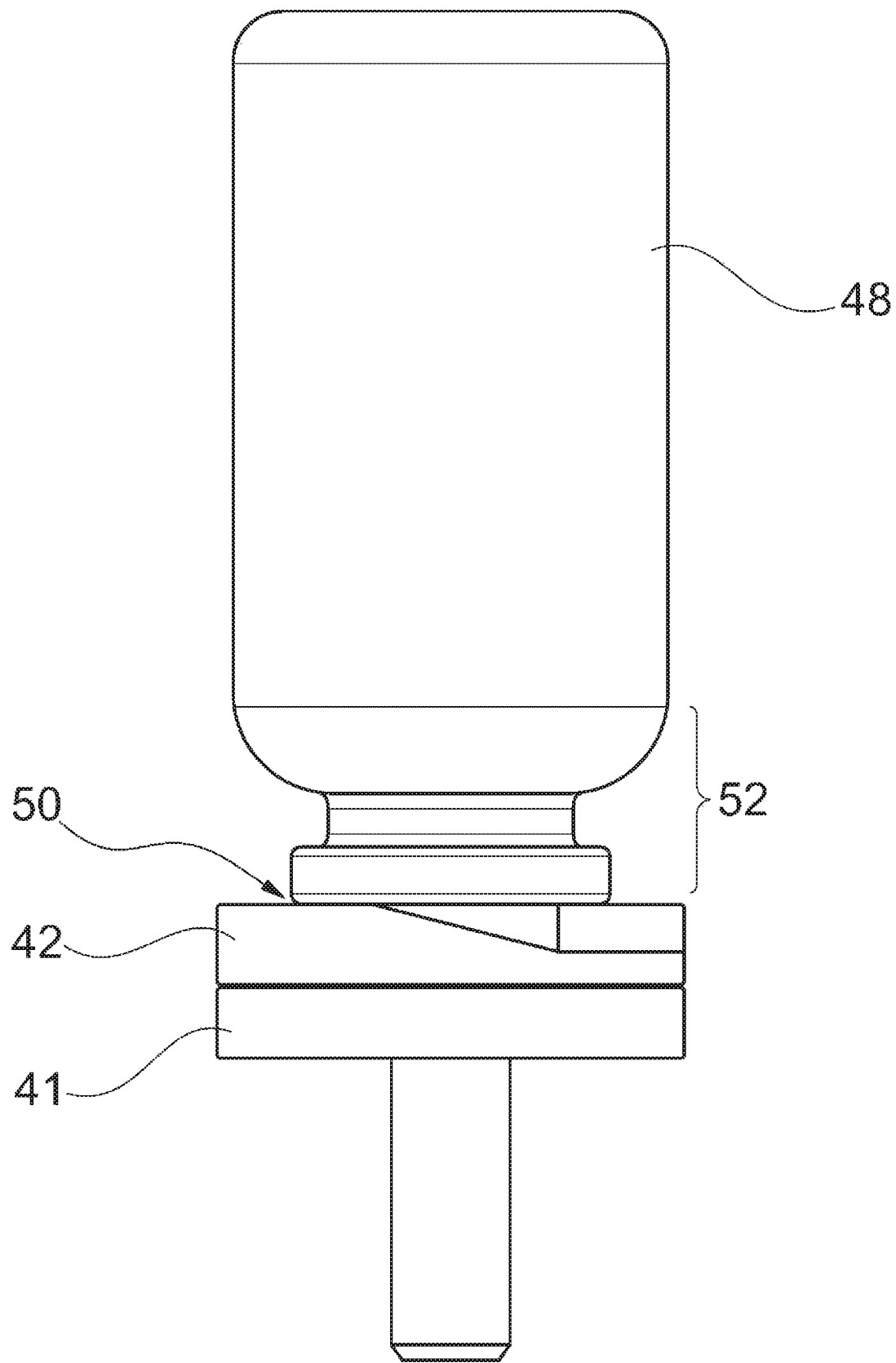

[Fig. 7]
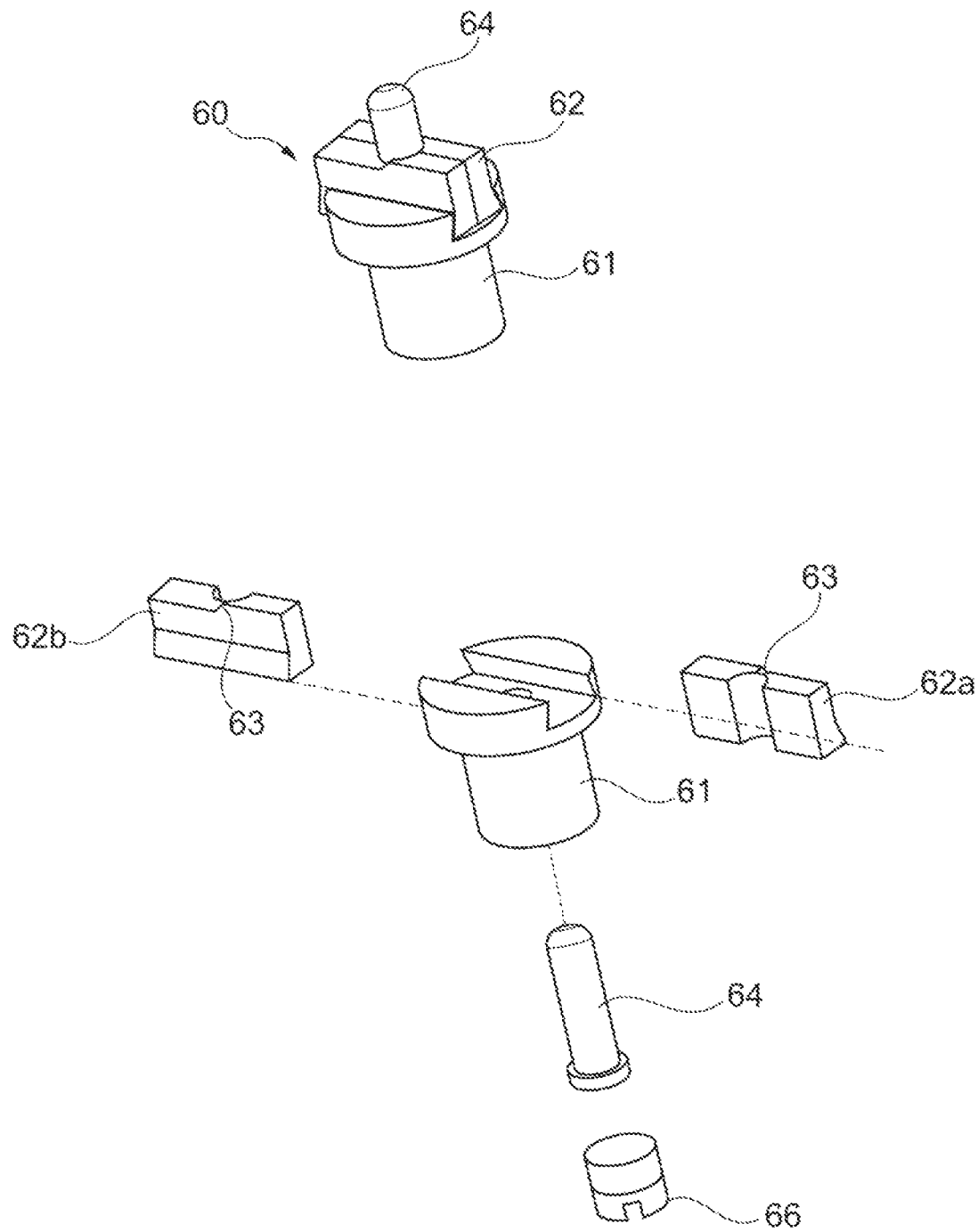

[Fig. 8A]
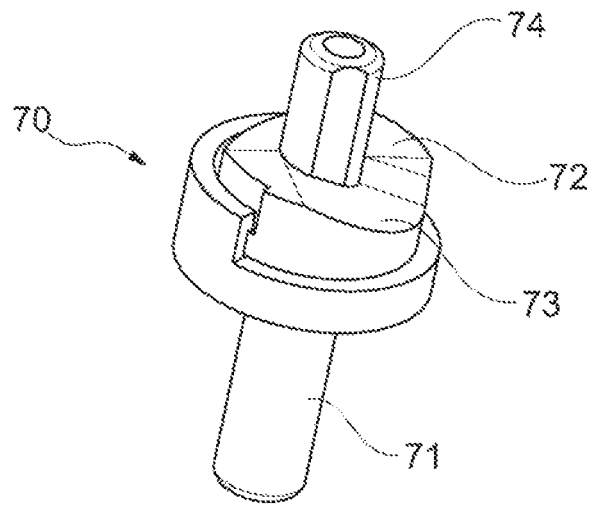
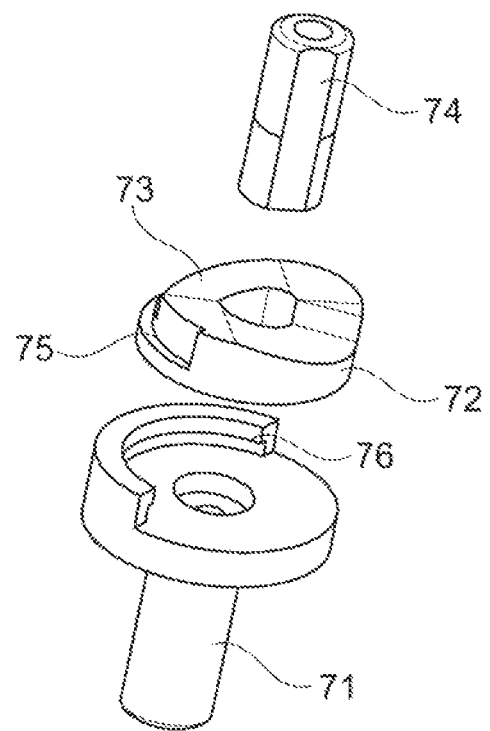

[Fig. 8B]
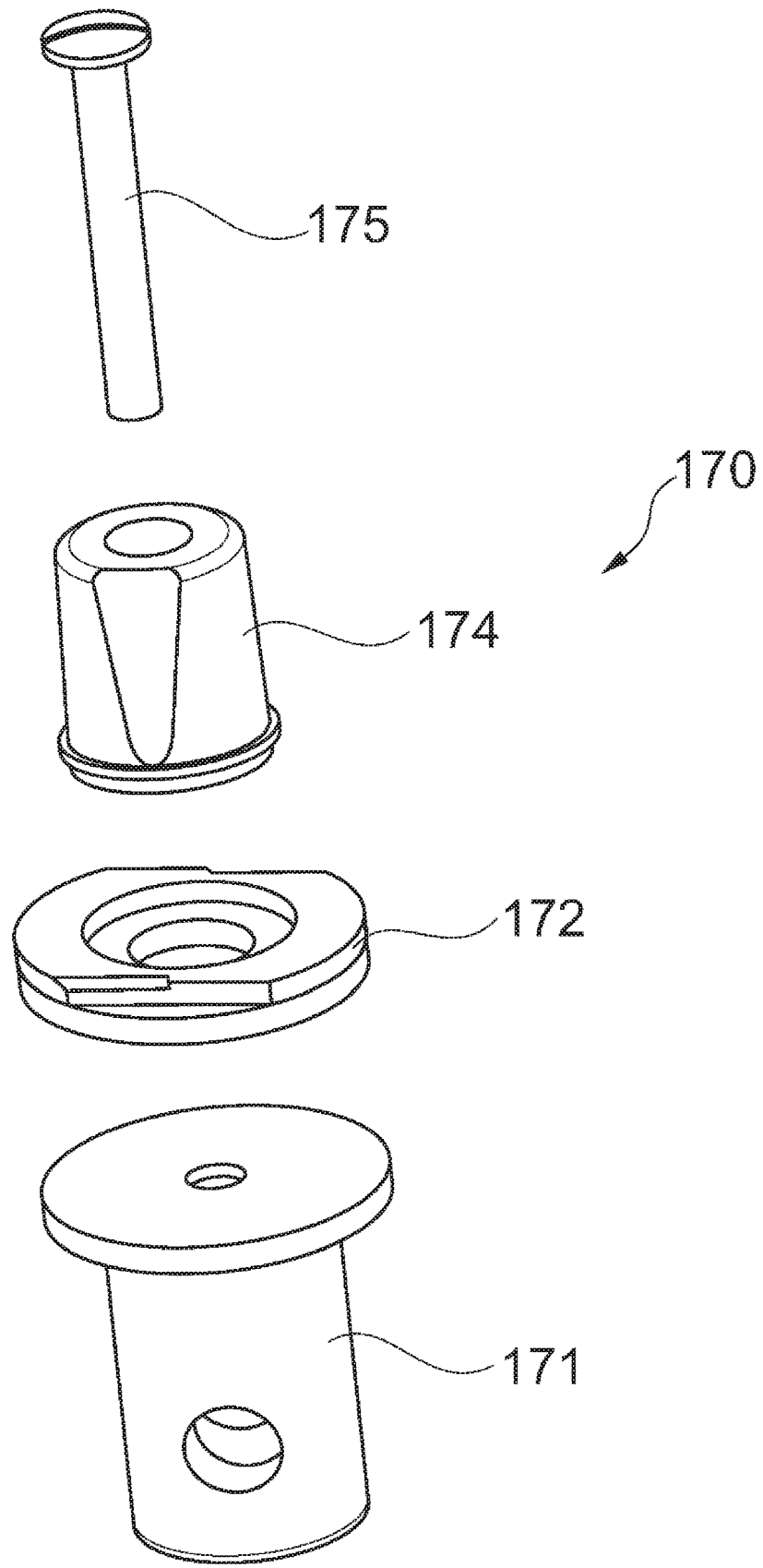

[Fig. 8C]
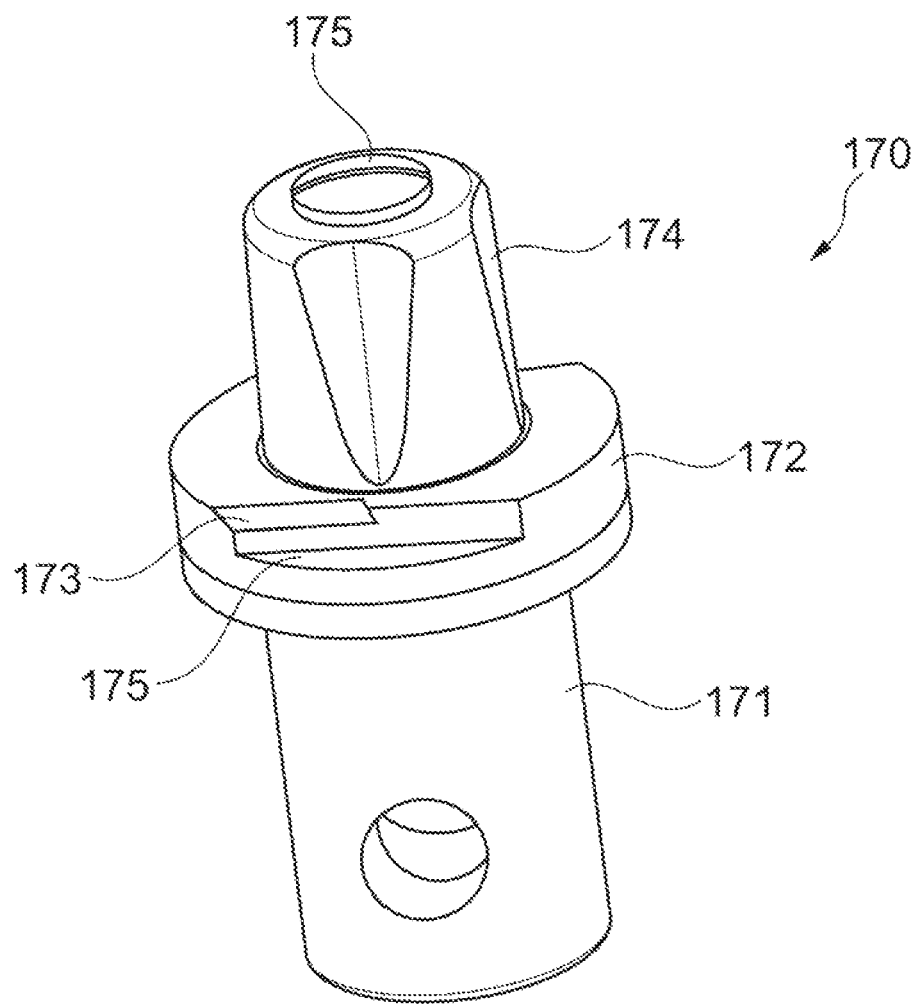

[Fig. 9A]
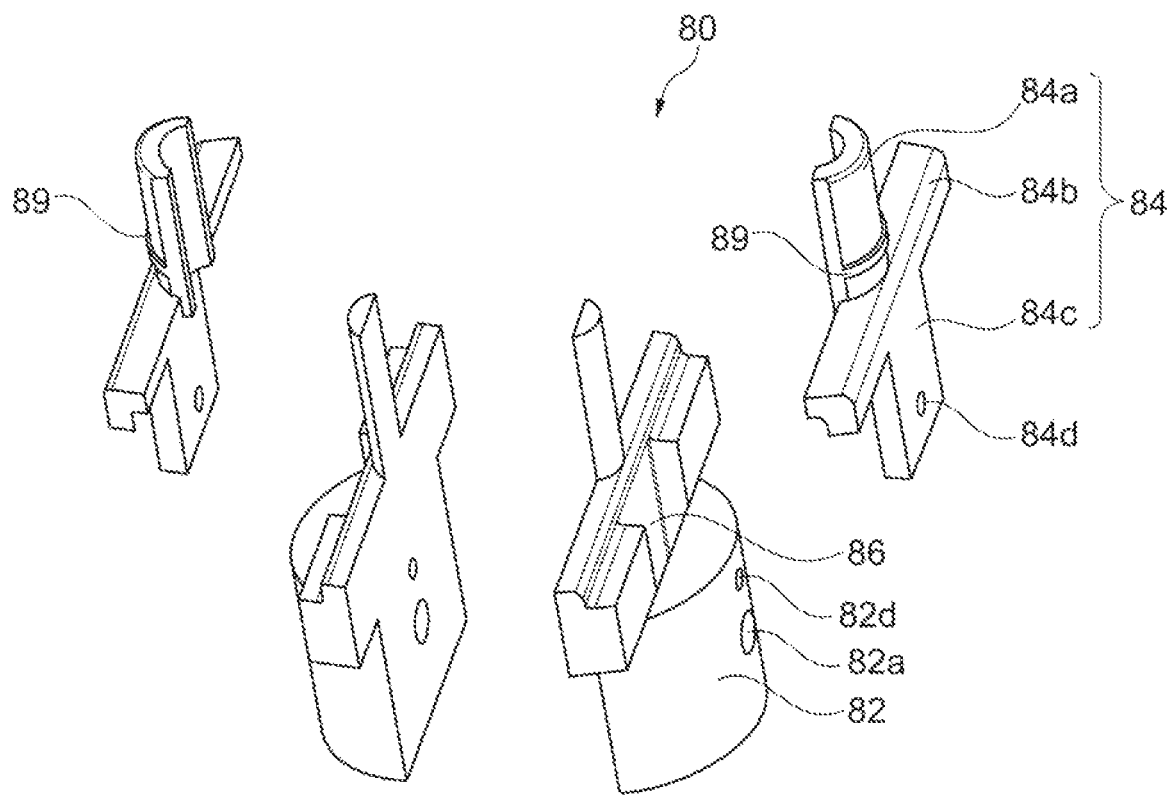

[Fig. 9B]
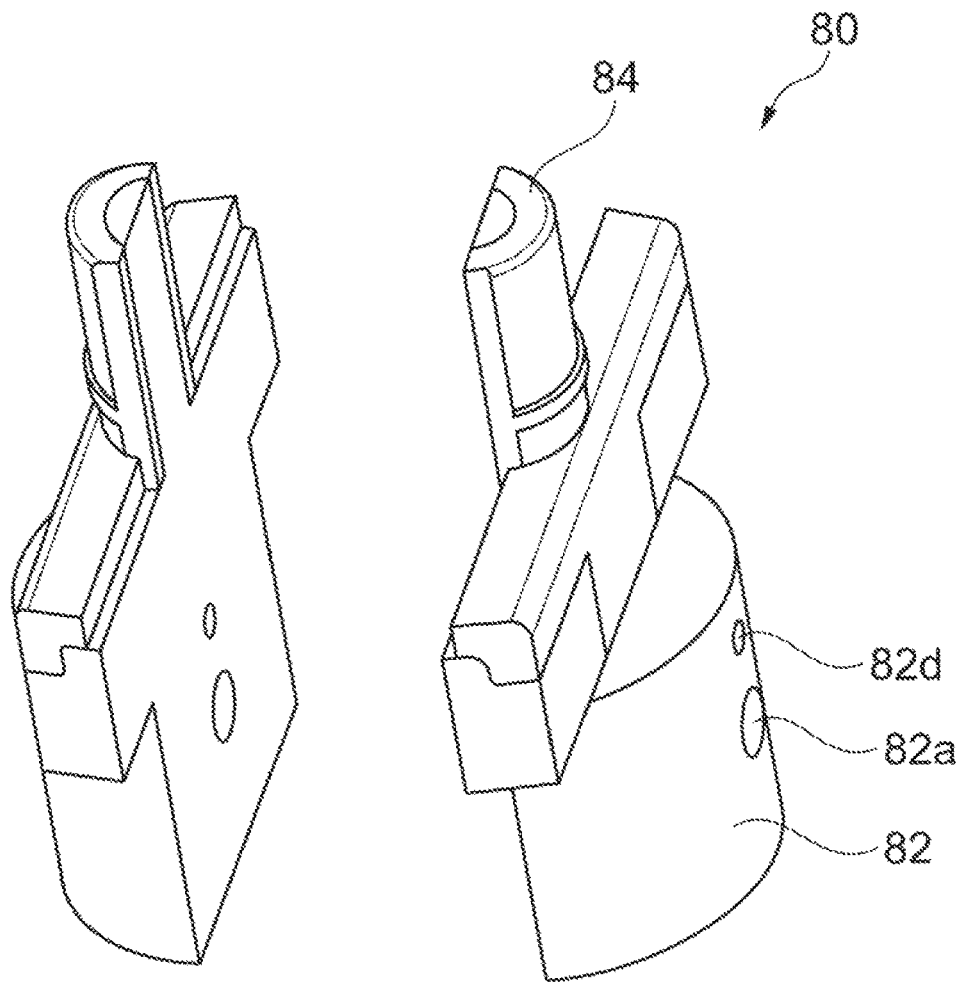
[Fig. 10A]
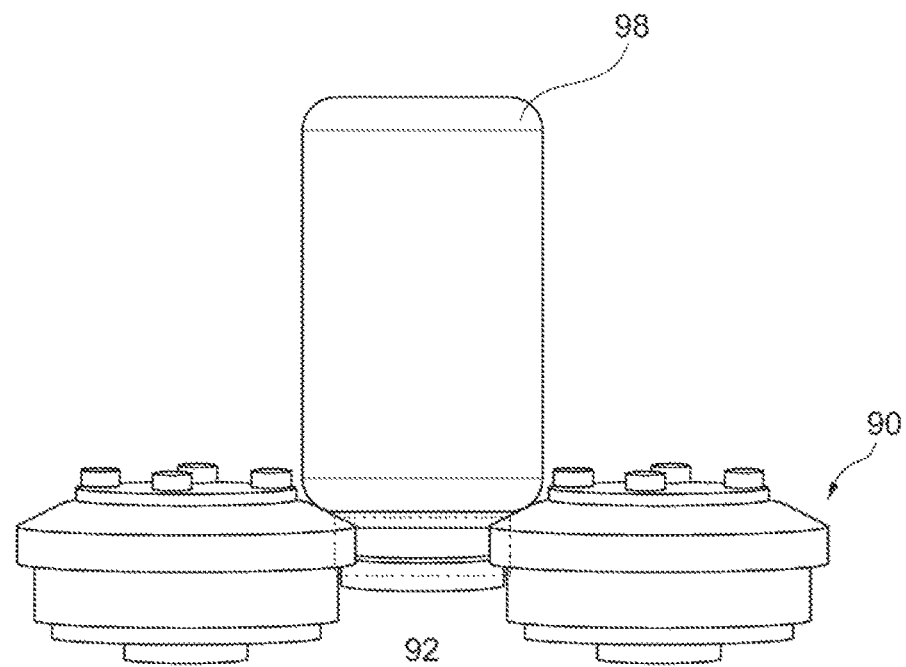

[Fig. 10B]
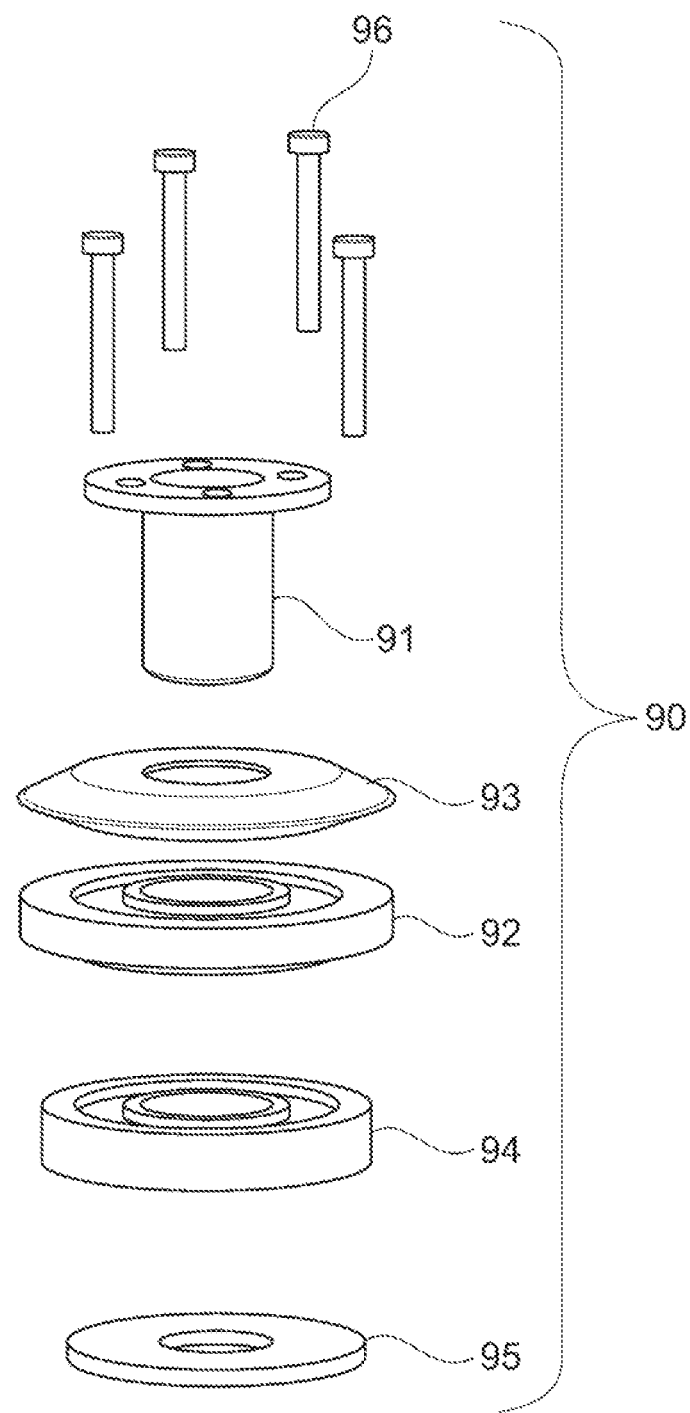

[Fig. 10C]
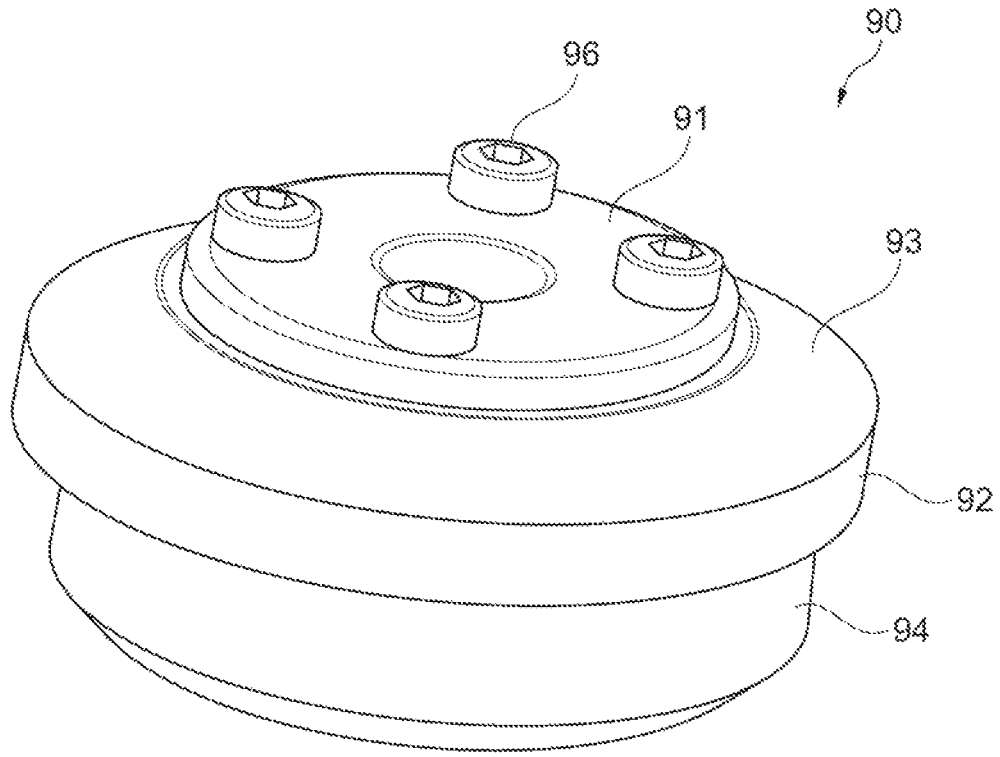
[Fig. 10D]
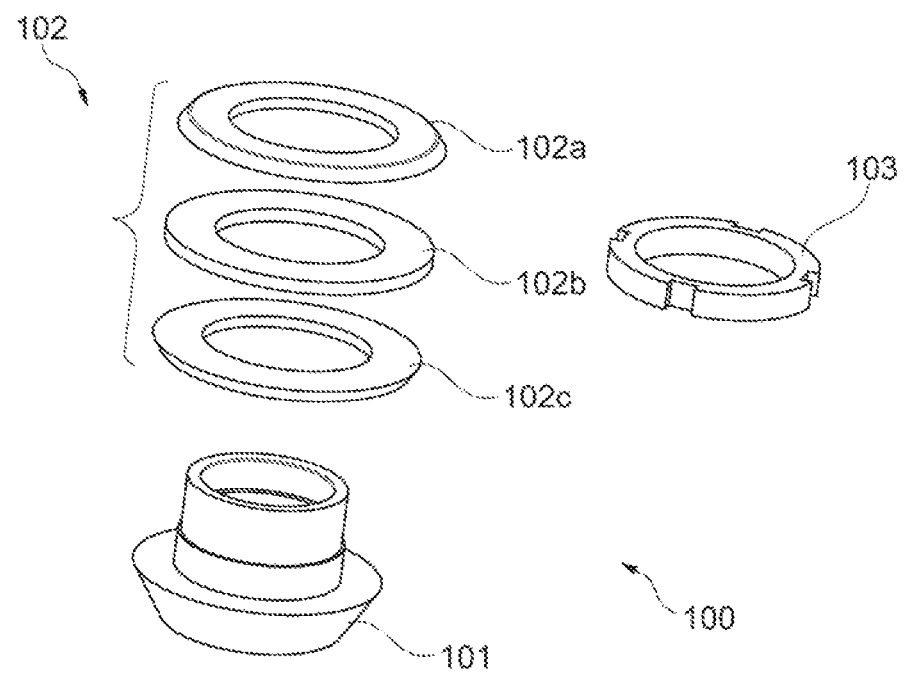

[Fig. 10E]
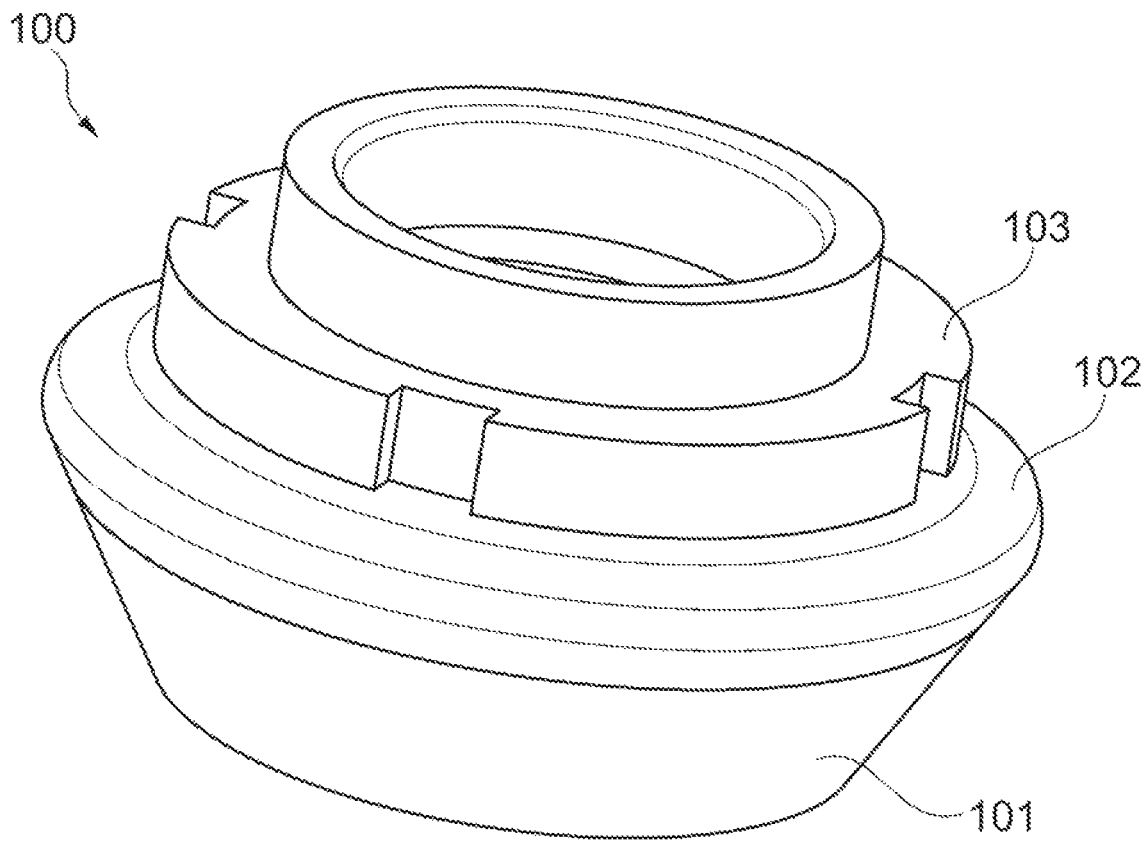
[Fig. 10F]
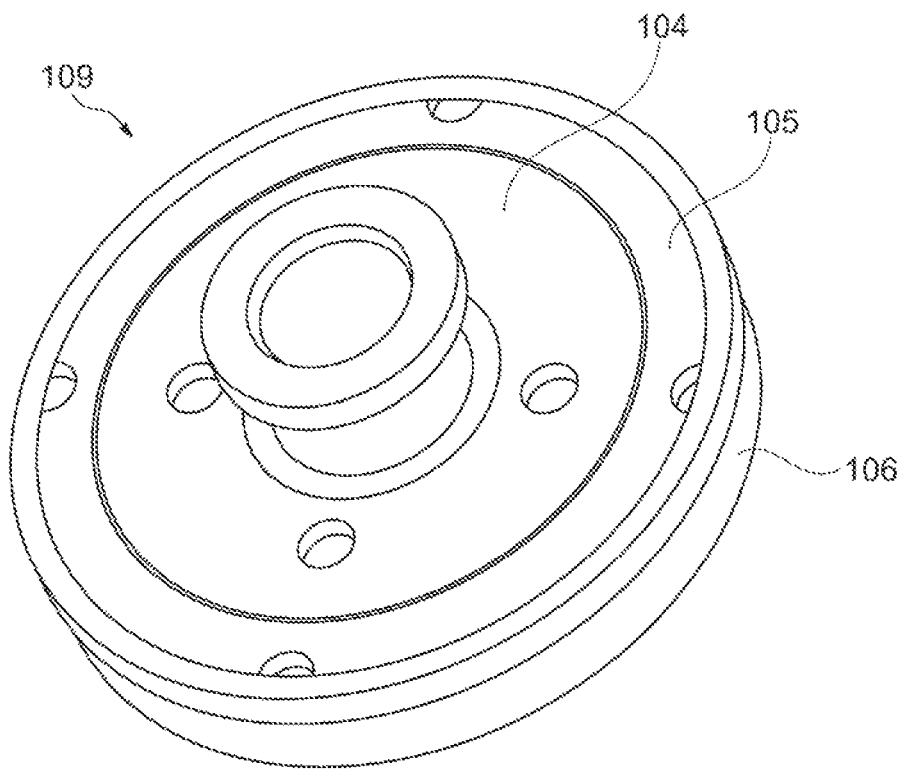

[Fig. 11]
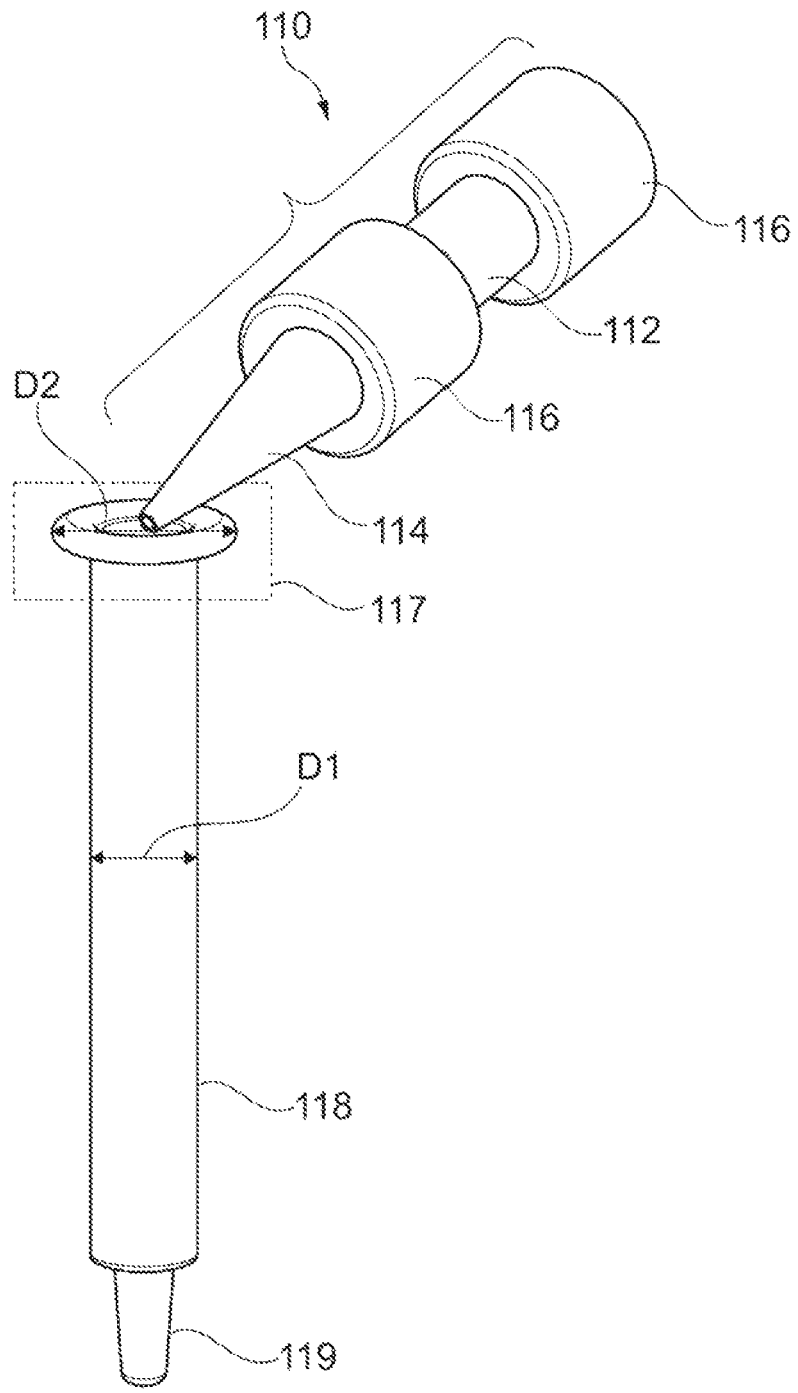

[Fig. 12]
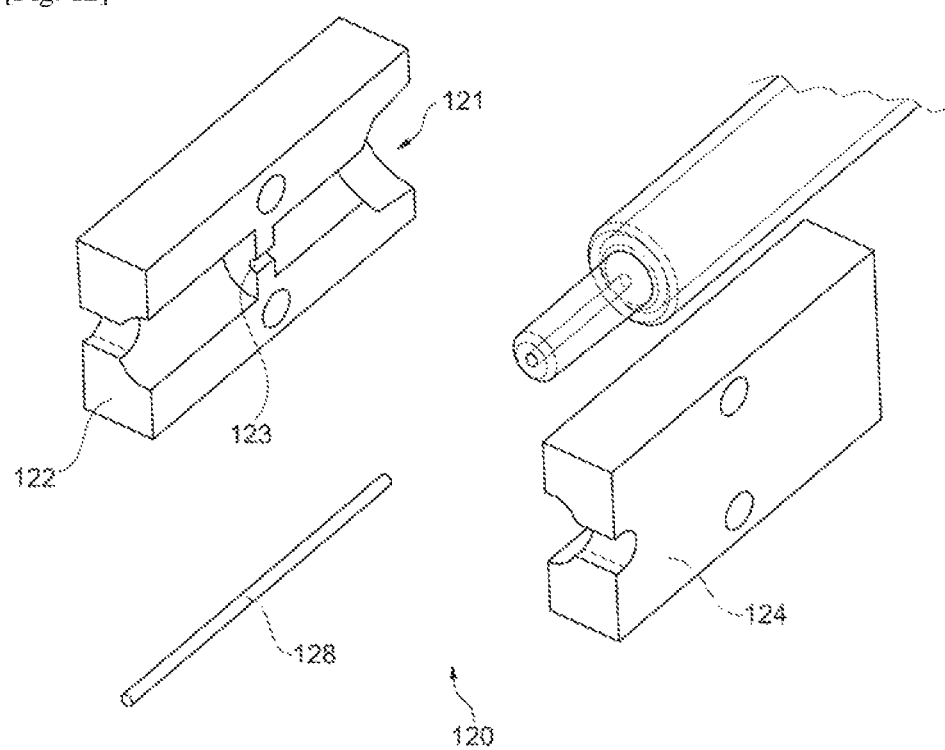

METHOD AND APPARATUS OF MANUFACTURING GLASS PRODUCTS

TECHNICAL FIELD

The present invention relates to a glass product, and more specifically, to a method and an apparatus of manufacturing a glass product for medical use, such as a vial, an ampule or the like.

BACKGROUND ART

U.S. Pat. No. 2,935,819 A discloses a machine for producing small glass bottles such as ampules from glass tubes. U.S. Pat. No. 3,222,157 A further discloses a method for the formation of bottom parts of ampules by pressing the closed ends of a glass tube against a plate (shaper) and rotating the glass tube to thereby arrange the shape of the bottom parts.

In these conventional methods, the tool used for shaping a certain portion of the glass container (e.g. a plate) is generally constituted by a metal or a ceramic. A metal plate is suitable for processing the bottom part of the glass container, but it is necessary to apply oil onto the plate as a parting agent to avoid adherence of the metal to the glass. Therefore, a step of removing the oil is necessitated, and the production method is complex. Furthermore, fine glass substances may adhere to the plate, and consequently, unevenness may easily occur on the contact surface of the plate. When the closed end of a glass tube is scraped by using the plate in such a state, the outer surface of the resulting bottom part is roughened due to the unevenness of the plate, and consequently, the outer surface of the bottom part having preferable light reflectivity cannot be obtained. Thus, with this technique inspection from the bottom side is not possible for the customer. In the case when a ceramic plate is used, fragments of the plate formed by the scraping of the plate due to the contact with the glass container may adhere to the bottom part of the glass container. Therefore, a step of removing the fragments is necessitated, and thus the production becomes complex.

SUMMARY OF INVENTION

Therefore, it is an object of the present invention to provide a manufacturing method allowing the production of glass containers in an easier way. It is also desired that the glass container product has a bottom surface having better light reflectivity. Furthermore, the manufacturing tools are desirably wear resistant and can be used without the use of lubricants and/or separating agents.

In one aspect, a method of manufacturing a glass product is provided. This method includes a step of providing an intermediate glass product; a step of heating a portion of the intermediate glass product to a predetermined temperature, a step of contacting a tool with the heated portion of the intermediate glass product and a step of rotating, under a state that the tool contacts the heated portion, at least one of the tool and the intermediate glass product so that the tool and the intermediate glass product relatively rotate, wherein a part of the tool that contacts the heated portion comprises or is made of glassy carbon.

In the following, whenever reference is made to a glass product, it is also referred to an intermediate glass product.

In some embodiments, the heated portion is at a closed end of the intermediate glass product, and the tool is a plate, the tool and the closed end of the intermediate glass product being configured to press against each other.

In some embodiments, the heated portion is at an open end of a glass tube.

In some embodiments, the glass product is a glass container and the heated portion corresponds to a neck of the glass container.

In some embodiments, the tool comprises a first forming element and a second forming element. The first forming element is configured to be brought into contact with an end surface of the intermediate glass product and forms said end surface. The second forming element is configured as a pin protruding from the first forming element. At the state the tool contacts the heated portion, a side surface of the second forming element contacts an inner surface of the heated portion, and a top surface of the first forming element contacts the open end surface of the intermediate glass product.

In some embodiments, a side surface of the tool presses against an outer surface of the heated portion.

In some embodiments, the tool includes a carrier and a ring coupled to the carrier and configured to press against the outer surface of the heated portion, wherein the ring includes or is made of glassy carbon and the carrier includes steel or graphite.

In some embodiments, the ring includes a first sub-ring, a second sub-ring and a third sub-ring concentrically stacked together, the second sub-ring being disposed between the first sub-ring and the third sub-ring, and a diameter of the second sub-ring being greater than a diameter of the first sub-ring and a diameter of the third sub-ring.

In some embodiments, the intermediate glass product is a glass tube having a first diameter at an end, the heated portion being at the end of the glass tube. The tool includes a pin having a tapered end, a side surface of the tapered end being configured to press against a portion of the end of the glass tube. Under a state that the tool presses against the heated portion, the heated portion is deformed such that the diameter of the glass tube at the end is increased from the first diameter to a second diameter.

In some embodiments, the tool includes a mold configured to accommodate the intermediate glass product.

In some embodiments, the tool is configured to form a syringe head. The tool includes a first mold and a second mold configured to coupled to each other to form a mold cavity corresponding to an outer shape of the syringe head, wherein a first groove is formed in the first mold and a second groove is formed in the second mold such that when the first mold and the second mold are coupled to each other, the first groove and the second groove are coupled to each other to form a through hole communicating the mold cavity. The tool further includes a pin configured to be inserted via the through hole into the mold cavity.

In some embodiments, the intermediate glass product is a glass tube having an opening of a first diameter at an end, the heated portion being at the end of the glass tube. The tool has a bottom surface and a side surface defining an accommodating space, the bottom surface being configured to press against the end of the glass tube. Under a state that the tool presses against the heated portion, the heated portion is deformed such that the diameter of the opening is decreased from the first diameter to a second diameter, the second diameter being greater than or equal to 0.

In some embodiments, a fine texture is formed on a surface of the tool that is to be contacted with the heated portion.

In some embodiments, the tool or the intermediate glass product rotates at a relative rotational speed of from 100 $min^{-1}$ to 500 $min^{-1}$ or an equivalent linear speed.

In another aspect, a tool for being used in a method of manufacturing a glass product is provided. The method includes the steps of providing an intermediate glass product; heating a portion of the intermediate glass product to a predetermined temperature; contacting the tool with the heated portion of the intermediate glass product; and under a state that the tool contacts the heated portion, rotating at least one of the tool and the intermediate glass product so that the tool and the intermediate glass product relatively rotate. A part of the tool that contacts the heated portion includes or is made of glassy carbon.

In yet another aspect, an apparatus for manufacturing a glass product is provided. The apparatus includes a tool to which a heated portion of a glass product is to be contacted; and a means for contacting the tool with the heated portion and rotating at least one of the tool and the glass product so that the tool and the glass product relatively rotate, wherein a part of the tool that contacts the heated portion comprises or is made of glassy carbon.

Advantageous Effects of Invention

According to the present invention, a surface, either of the bottom part or of the neck of a glass container, can be produced with, for example, better light reflectivity and without undergoing complex steps.

BRIEF DESCRIPTION OF DRAWINGS

In the following embodiments of the invention are illustrated with reference to the drawings, in which:

FIG. 1 is a schematic diagram of a tool that is configured to press against a close end of a glass product according to a first embodiment of the present invention;

FIG. 2 is a schematic diagram that shows an air inlet and a plurality of air outlets of the tool of the first embodiment;

FIG. 3A is a schematic view of the tool of the first embodiment being in contact with the closed end of a glass tube;

FIG. 3B is a schematic cross-sectional view of the tool of the first embodiment being in contact with the closed end of the glass tube;

FIG. 4 is an exploded view of a tool that is configured to contact with an open end of a glass product according to a second embodiment of the present invention;

FIG. 5 is a schematic diagram of the tool of the second embodiment;

FIG. 6 is a schematic view of the tool of the second embodiment being in contact with the open end of the glass product;

FIG. 7 shows another example of the tool of the second embodiment;

FIG. 8A shows another example of the tool of the second embodiment;

FIG. 8B shows another example of the tool of the second embodiment;

FIG. 8C shows another example of the tool of the second embodiment;

FIG. 9A shows another example of the tool of the second embodiment;

FIG. 9B shows another example of the tool of the second embodiment;

FIG. 10A is a schematic view of a tool being in contact with an open end of a glass product according to a third embodiment of the present invention;

FIG. 10B illustrates the tool of FIG. 10A;

FIG. 10C illustrates the tool of FIG. 10A;

FIG. 10D illustrates another example of the tool according to the third embodiment;

FIG. 10E illustrates another example of the tool according to the third embodiment;

FIG. 10F illustrates yet another example of the tool according to the third embodiment;

FIG. 11 illustrates a schematic view of a tool in contact with a glass product according to a fourth embodiment of the present invention;

FIG. 12 illustrates an exploded view of a tool for accommodating and shaping a glass product according to a fifth embodiment of the present invention;

DESCRIPTION OF EMBODIMENTS

Figure 13A:
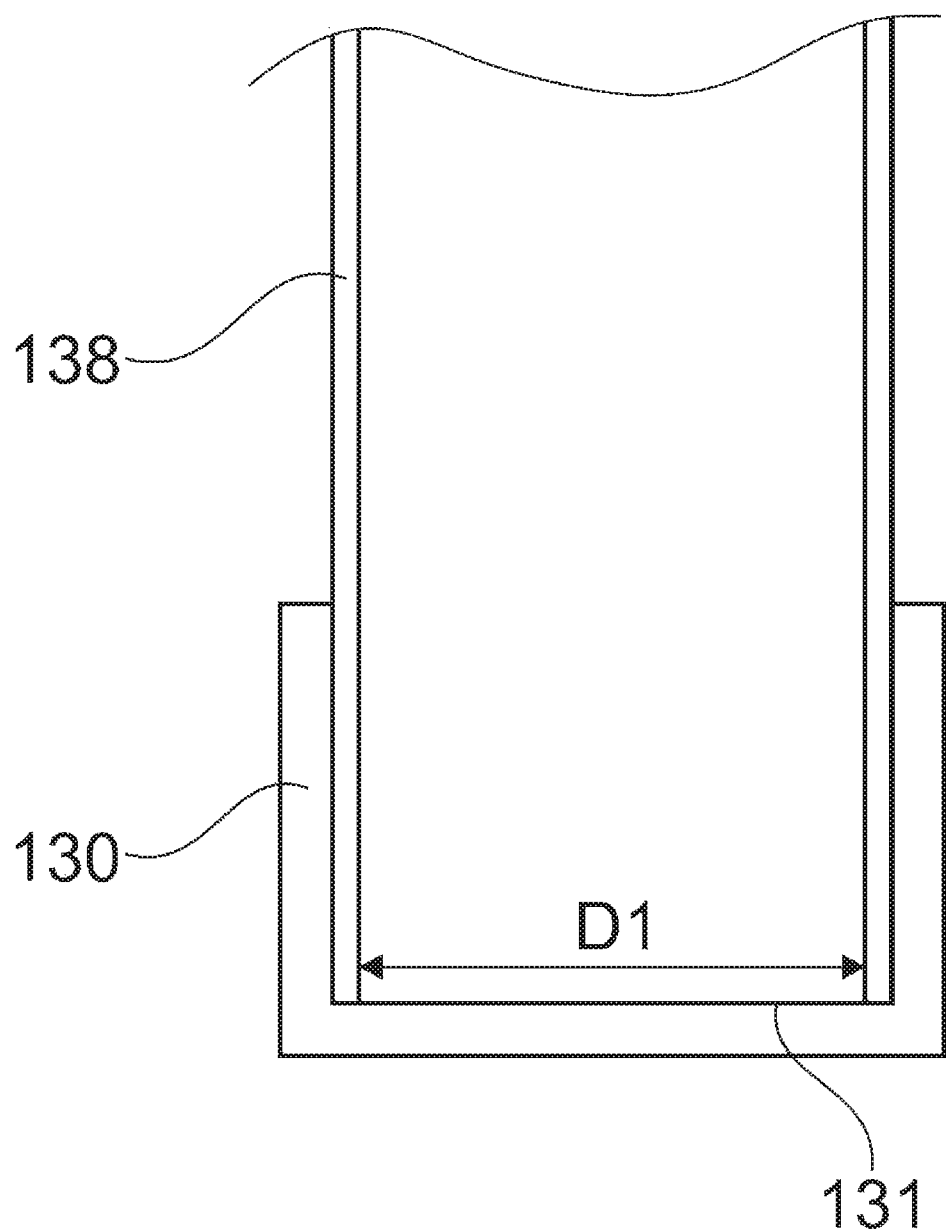
FIG. 13A illustrates a schematic view of a method of manufacturing a glass product according to a sixth embodiment of the present invention.

Reference will now be made in detail to some preferred, but not limiting embodiments of the present invention, some examples of which are illustrated in the accompanying drawings.

The present invention provides a method of manufacturing a glass product, which includes at least the steps of (A) providing a glass product, particularly an intermediate glass product; (B) heating a portion of the glass product to a predetermined temperature, (C) contacting a tool with the heated portion of the glass product and (D) under a state that the tool contacts the heated portion, rotating at least one of the tool and the glass product so that the tool and the glass product relatively rotate, wherein a part of the tool that contacts the heated portion comprises or is made of glassy carbon. The method of manufacturing a glass product may optionally include a step (E) of cooling the tool. More specifically, a surface of the tool that is being contacted with the heated portion of the glass tube may be cooled, for example, with air. These steps will be described in detail in the following.

In some embodiments, the final glass product may be a medical container for enclosing, for example, a liquid or a solid. Said solid may include a powdery medical composition such as a drug. Specific examples of these glass products include a vial, an ampule or the like.

In some embodiments, the glass product or intermediate glass product provided in step (A) may be a glass tube and may have a closed end that will form a bottom part of the glass product. Alternatively, the glass product or intermediate glass product may be a glass tube having an open end, wherein a "neck" of a glass container will be formed in proximity of the open end. The glass product or intermediate glass product may include or be made of borosilicate glass. Preferably, the glass product or intermediate glass product may be made of Type 1 glass. Such material has good compatibility with the carbon material used in the present invention for the tool, as described below, and thus can produce a glass product having an outer surface with desired reflectivity.

In some embodiments, step (B) of the method according to the present invention may be carried out by a burner. The predetermined temperature in step (B) may be in a range of from 900° C. to 1,400° C. Preferably, the glass product or intermediate glass product, e.g., a glass tube, may be heated to a temperature that is above the trans-formation temperature of the glass material. When the glass product or intermediate glass product is heated to a temperature within this range and subsequently subjected to the treatment of steps (C) and (D), the resulting surface of the glass product will have preferable reflectivity, particularly a reflectivity that is more homogenous than achievable with prior art manufacturing techniques.

In some embodiments, only one of the tool and the glass product or intermediate glass product is rotated in step (D). Alternatively, the tool and the glass product or intermediate glass product may be rotated simultaneously, in the same or opposite directions. When at least one of the tool and the glass product or intermediate glass product are rotated, the relative rotational speed (frequency) may be from 100 $min^{-1}$ to 500 $min^{-1}$.

In some embodiments, the tool used in steps (C) and (D) includes specific carbon materials. Specifically, at least the part of the tool that is to contact the heated portion of the glass product or intermediate glass product is made of glassy carbon. The whole tool may be made of such material. Other structures such as a substrate (e.g. a graphite substrate) coated with the above material or a support provided with the above material may also be used as the tool.

As used herein, "glassy carbon" indicates a form of carbon with a highly disordered structure. It is also known as "glassy-like carbon" or "vitreous carbon" and is sometimes described as "non-graphitizing carbon" or "non-graphitizable carbon". While the exact atomic structure of glassy carbon is not completely understood, it is known that it consists purely of sp2 bonded carbon atoms and may have a fullerene-related structure. Glassy carbon is commercially available, for example, under the trademark SIGRADUR (registered) from HTW Hochtemperatur-Werkstoffe GmbH, Thierhaupten, Germany. In some other embodiments, the tool used in the present invention may be made of or comprises other amorphous carbon material such as diamond-like carbon (DLC).

According to the present invention, by using a tool including or being made of glassy carbon in the production of the glass product, the lubricity between the heated portion of the glass product or intermediate glass product and the tool is improved. As a result, the amount of oil for use as a parting agent can be reduced. In a specifically preferable case, it is not necessary to use oil or other lubricants at all. As a result, the step of removing oil, which has been conducted in the conventional methods, can be omitted, and consequently, a simplified manufacturing process can be obtained.

Moreover, glassy carbon has a high wearing resistance as compared to other carbon materials (for example, graphite). In the conventional production of a glass product (e.g., a vial), a tool is contacted with (or pressed against) a surface of the heated portion of the glass product such as a glass tube, and the tool and the glass tube are relatively rotated to shape the heated portion. During this process, the tool is worn due to friction with the surface of the heated portion. Over time, the surface of the tool that is brought into contact with the heated portion of the glass tubes is roughened. As a result, the light reflectivity of the surface of the bottom part is compromised in terms of homogeneity due to the topology and dimension changes of the tool, and it is thus necessary to replace the tool with a new one. One the other hand, when a tool of glassy carbon according to the present invention is used, the number of glass products that can be produced after the initiation of the use of the tool until replacement is necessitated is greater than the number of glass products produced in the case when a tool made of other carbon materials (for example, graphite) is used. At the same time, the quality of the produced glass products is superior. In other words, the frequency of replacement of the tool is decreased, or the interval of replacement of the tool is extended. Consequently, it becomes unnecessary to frequently replace the tool, and thus effort for the replacement of the tool can be reduced or omitted.

In the case when a tool including or being made of glassy carbon is used, the Vickers Hardness (HV) thereof is from 180 HV to 400 HV, preferably 200 HV to 360 HV, more preferably 220 HV to 340 HV, and most preferably 230 HV to 250 HV. The Vickers Hardness is calculated by measuring the diagonal lengths of an indent left by introducing a diamond pyramid indenter with a given load into the specimen material. The loads used range from 9.8 mN (1 gf) up to 980 N (100 kgf). The Vickers test can be used to test all solid materials and is suitable for a wide range of applications. The applicable standards that can be referred to are, for example, ASTM E384 (for micro and macro ranges), ISO 6507 (for micro and macro ranges) and JIS Z 2244.

In some embodiments, the cooling of step (E) can be achieved by arranging at least one air conduit in the tool, as exemplarily described with reference to FIGS. 2 and 3B below.

In some embodiments, the tool is further provided with a fine texture, formed on its surface that is to be contacted with the heated portion of the glass product or intermediate glass product. The fine texture may have a structure that is similar to an ordinary grinding paper. The surface roughness Rz of the fine texture may be within the range of 0.4 to 1.8 μm, wherein Rz is a commonly understood measure of the surface roughness and is calculated based on the five highest peaks and five lowest valleys over the entire sampling length. The fine texture may prevent the air from trapping between the heated glass and the tool, thereby providing a better reflectivity of the resulting surface of the glass container.

Some specific configurations of the tool that can be used in the present invention are further described below.

FIGS. 1 and 2 respectively show different perspective views of a tool according to a first embodiment of the present invention. FIG. 3A is a schematic view of the tool of the present embodiment being in contact with the closed end of a glass product or an intermediate glass product such as a glass container (e.g., a vial). FIG. 3B is a cross-sectional view of a tool and a glass product or an intermediate glass product at the same state as FIG. 3A. The tool of the first embodiment is used for forming a bottom part of a glass container.

Referring to FIGS. 1, 2, 3A and 3B, the tool 10 includes a carrier 11, a coupling nut 14 surrounding the carrier 11, and a plate-like insert 12 disposed on the carrier 11 and within the nut 14. The plate-like insert 12 shown in FIG. 3B is a disk-shaped plate having a substantially flat surface. The present invention, however, is not limited thereto. The plate-like insert may also have a convex (see, for example, FIG. 3A), concave or any other topological surface in other embodiments. Although the interface between the carrier 11 and the nut 14 is shown as a smooth surface (a straight line) in FIG. 3B, it is also contemplated that corresponding threads may be formed respectively on the inner surface of the nut 14 and on the outer side surface of the carrier 11 so that they can engage with each other. An air inlet 24 and a plurality of air outlets 26 are formed within the carrier 11, the air inlet 24 being in fluid communication with the air outlets 26. In the present embodiment, the air inlet 24 is formed at the central position of the carrier 11, while the air outlets 26 surround the air inlet 24. Other configurations are also possible as long as the cooling fluid (e.g., air) can properly reach the plate-like insert 12.

As shown in FIG. 3A or 3B, in the present embodiment, the glass product or intermediate glass product 18 has a closed end 20 that will form the bottom part of the glass container. In the manufacture of the glass container, at least the closed end 20 is heated to a predetermined temperature, and the closed end 20 is pressed against the plate-like insert 12. In this regard, at least one of the tool 10 and the glass product 18 is held by a mechanism (e.g., a chuck) that is capable of bringing these two elements into contact (not shown).

In the manufacture of the glass container, at least one of the tool 10 and the glass product 18 is rotated about an X axis in a state that an outer surface 22 of the closed end 20 is pressed against a contact surface 16 of the plate-like insert 12, as schematically shown in FIGS. 3A and 3B, so that the tool 10 and the glass product 18 relatively rotate. In this regard, at least one of the tool 10 and the glass product 18 is held by a mechanism that is capable of actuating a rotational movement about the X axis (not shown). In the situation that both the tool 10 and the glass product 18 rotate, they may rotate in opposite directions (see arrows A and B in FIG. 3B). Furthermore, air may be injected into the center of a space between the insert 12 and the nut 14 through the air inlet 24, and is discharged through the air outlets 26. By feeding and discharging air in such way, the plate-like insert 12 is cooled, whereby adhesion of the heated portion (e.g., the close end 20) of the glass product 18 to the insert 12 can be prevented.

In the present embodiment, at least a part of the plate-like insert 12 that forms the contact surface 16 is constituted by glassy carbon. In some cases, the entirety of the plate-like insert 12 may be formed of glassy carbon, and in other cases, only the part of the plate-like insert 12 that forms the contact surface 16 is made of glassy carbon. In such a case, the plate-like insert 12 may be formed by having a layer of glassy carbon coated on a substrate. Specifically, a plate-like insert can be formed by forming a coating of glassy carbon on a graphite substrate.

When glassy carbon is used, the heated portion of the glass product or intermediate glass product 18 is less prone to adhere to the plate-like insert 12. Consequently, after the formation of the bottom part of the glass container, the plate-like insert 12 can be easily removed from the bottom part. In addition, fine substances of glass (flakes or granular substances for example) are less prone to adhere to the plate-like insert 12. If these fine substances adhere to the plate-like insert, the surface of the plate-like insert would be roughened, and if the closed end 20 is contacted with the plate-like insert that has been roughened in such way, the light reflectivity of the surface of the thus-obtained bottom part would be adversely affected. Therefore, the use of glassy carbon suppresses the adhesion of the fine substances to the plate-like insert 12. Consequently, when such a plate-like insert is used, preferable more uniform reflectivity of the surface of the bottom part of the glass container can be achieved.

FIGS. 4 to 6 illustrate a tool according to a second embodiment of the present invention that is configured to contact an open end of a glass product or an intermediate glass product such as a glass vial. FIG. 4 is an exploded view of the components of the tool. FIG. 5 is a perspective view of the tool assembled together. FIG. 6 is a schematic view of the tool being in contact with the open end of the glass product or intermediate glass product.

Referring to FIGS. 4 to 6, the tool 40 includes a carrier 41, a first forming element 42 mounted on the carrier 41, and a second forming element configured as a pin (or a mandrel) 44 mounted on and protruding from the first forming element 42. The carrier 41, the first forming element 42 and the pin 44 can be combined by commonly known means such as a screw 45, as shown in FIGS. 4 and 5.

The tool 40 in the present embodiment is used for forming a "mouth" portion of the glass container. As shown in FIG. 6, in the manufacture of the glass container, a portion 52 of the glass product or intermediate glass product 48 that is close to an open end 50 is heated to a predetermined temperature and then the open end 50 of the intermediate glass product 48 is contacted with the first forming element 42 of the tool 40. The heated portion 52 of the glass product or intermediate glass product 48 is a portion that will form a neck of the glass container. Similar to the first embodiment discussed above, at least one of the tool 40 and the glass product or intermediate glass product 48 is held by a mechanism that is capable of bringing these two objects into contact.

When the tool 40 contacts the heated portion 52 of the glass product or intermediate glass product 48, a side surface of the pin 44 contacts an inner surface of the heated portion 52, and a top surface 43 of the first forming element 42 contacts the open end 50 of the glass product or intermediate glass product 48. The inner surface of the heated portion 52 may be contacted with the side surface 45 of the pin 44 by a lateral force exerted to the heated portion 52 (see, for example, FIG. 10A). Furthermore, similar to the first embodiment, at least one of the tool 40 and the glass product or intermediate glass product 48 is rotated in such a state.

In the present embodiment, the entirety of the pin 44 and the entirety of the first forming element 42 are made of glassy carbon. The present invention, however, is not limited thereto. It is also possible that only parts of the pin 44 and the first forming element 42 that contact the heated portion 52 are made of glassy carbon (see, for example, FIGS. 9A and 9B).

In some embodiments, the first forming element 42 may be shaped such that only a part of the top surface 43 of the first forming element 42 contacts the open end 50 of the glass product or intermediate glass product 48. For example, in the present case, two oppositely located recesses 49 are formed on the first forming element 42, as shown in FIG. 4. As a result, when the tool 40 contacts the open end 50 of the glass product or intermediate glass product 48, a proper planar end surface can be formed on the glass product or intermediate glass product 48.

In some embodiments, the pin 44 is shaped such that only a part of the side surface of the pin 44 contacts the inner surface of the heated portion 52. For example, in the present case several inclined surfaces are formed on the substantially vertical side surface of the pin 44 (see FIGS. 4 and 5), so as to suppress the adhesion of the pin 44 to the heated portion 52, and also to ensure a proper inner side surface can be formed on the glass product or intermediate glass product 48.

FIG. 7 illustrates an exploded view as well as a perspective view of another example of the tool according to the second embodiment. Referring to FIG. 7, a tool 60 includes a carrier 61, a first forming element 62 and a second forming element in the form of pin 64. The first forming element 62 is composed of two separate components 62a and 62b, each of which is provided with a step 63 so that, when the tool 60 is in use, only a part of the top surface of the first forming element 62 contacts the open end of a glass product or an intermediate glass product. As can be seen from FIG. 7, the carrier 61 is formed with a recess and a through hole respectively for accommodating the first forming element 62 and the pin 64, and the components 62a and 62b of the first forming element 62 are formed with corresponding recesses for accommodating the pin 64. By this arrangement, the carrier 61, the first forming element 62 and the pin 64 can be combined together and secured with a fixing element, e.g., a lock screw 66.

FIG. 8A illustrates an exploded view and a perspective view of another example of the tool of the second embodiment. Referring to FIG. 8A, a tool 70 includes a carrier 71, a first forming element 72 and a second forming element formed as a pin 74. The first forming element 72 is provided with slopes 73 so that, when the tool 70 is in use, only a part of the top surface of the first forming element 72 contacts the open end of a glass product or an intermediate glass product. The pin 74 of FIG. 8A is not perfectly cylindrical (or columnar) as the pin 64 shown in FIG. 7. Parts of the side surface of the pin 74 are flat instead of curved. In other words, the distance from the central axis of the pin 74 to a certain point on the side surface thereof varies circumferentially so that, when the tool 70 is in use, only a part of the side surface of the pin 74 contacts the inner surface of the heated portion of the glass product or intermediate glass product.

Referring to FIG. 8A, a rotation stop in a form of a step 75 is formed at the bottom of the first forming element 72 to extend along a section of the circumference of the first forming element 72. A structure 76 corresponding to the step 75 (a counterpart rotation stop) is formed on the top of the carrier 71 so that when the first forming element 72 is coupled (engaged) to the carrier 71, the vertical walls at the respective ends of the step 75 contact the vertical walls at the respective ends of the structure 76, preventing the carrier 71 and the first forming element 72 from relatively rotating.

FIGS. 8B and 8C respectively illustrate an exploded view and a perspective view of another example of the tool according to the second embodiment. A tool 170 includes a carrier 171, a first forming element 172, a second forming element in a form of a pin 174 and a screw 175 for combining these components. The tool 170 shown in FIGS. 8B and 8C is similar to that shown in FIGS. 7 and 8A, with the main difference that the first forming element 172 is provided with a slope 173 and a step 175 so that, when the tool 170 is in use, only a part of the top surface of the first forming element 172 contacts the open end of a glass product or an intermediate glass product.

FIGS. 9A and 9B illustrate an exploded view and a perspective view of another example of the tool according to the second embodiment. Referring to FIGS. 9A and 9B, a tool 80 includes a base 82 and a head (insert) 84 that can be mounted onto the base 82. Specifically, the head 84 comprises an upper part 84a configured to contact the inner surface of the glass product or intermediate glass product, a middle part 84b configured to contact the open end of the glass product or intermediate glass product, and a lower part 84c configured to be inserted into an insert pocket 86 formed in the base 82. Corresponding threaded holes 82d and 84d may be formed respectively at the base 82 and the lower part 84c of the head 84 so that the head 84 and the base 82 can be combined by, for example, a screw (not shown) through the threaded holes 82d and 84d. As shown in FIGS. 9A and 9B, the base 82 and the head 84 are each composed of two separate, identical components. In such a case, a threaded hole 82a may be formed at each of the base components 82 so that these separate components may be combined by, for example, a screw (not shown) through the threaded holes 82a. Furthermore, a feature may be formed on a side surface of the upper part 84a of the head 84 in order to shape the inner surface of the glass product. For example in FIGS. 8 and 9, a protrusion 89 is formed on the side surface of the upper part 84a of the head 84 so that when a heated portion of the glass product or intermediate glass product is pressed against the head 84, the protrusion 89 forms a groove or recess at the inner surface of the glass product or intermediate glass product. The recess may provide better sealing by a lid for the glass container in that an engagement feature of the lid can engage with the undercut provided by the groove or recess in the glass product or intermediate glass product.

The head 84 is made of glassy carbon while the base 82 not necessarily comprises glassy carbon. Together, the base 82 and the head 84 form corresponding parts of the "pin (the second forming element)" and "the first forming element" of the previous examples shown in FIGS. 4 to 8C. However, in the present example, only parts of the "pin" and the "the first forming element" that contact the heated portion of the glass product or intermediate glass product are made of glassy carbon.

FIG. 10A is a perspective view of a tool being in contact with an open end of a glass product or an intermediate glass product according to a third embodiment of the present invention. The tool of the present embodiment is also used for forming the "mouth" portion of a glass container, and may be used in cooperation with the tools illustrated in FIGS. 4 to 9B. The tool 90 may be a roller. When in use, a side surface of the tool 90 contacts an outer surface of the heated portion 92 of the glass product or intermediate glass product 98, and at least one of the tool 90 and glass tube 98 is rotated. If both the tool 90 and the glass tube 98 are rotated, their rotational axes may be substantially parallel to each other. In this regard, at least one of the tool 90 and the intermediate glass product 98 is held by a mechanism that is configured to bring these two objects into contact, and at least one of the tool 90 and the glass product or intermediate glass product 98 is held by a mechanism that is configured to actuate a rotational movement. For example, the tool 90 can be mounted on a carrier that is configured to rotate the tool 90 and to move in a direction perpendicular to its rotational axis. As shown in FIG. 10A, an apparatus for manufacturing a glass product may include a pair of tool 90 configured to approach and press against the heated portion 92 of the glass product or intermediate glass product 98 from opposite sides.

FIGS. 10B and 10C respectively illustrate an exploded view and a perspective view of the tool according to the third embodiment. Referring to both figures, the tool 90 includes a carrier 91, a ring 92 coupled to the carrier 91 and configured to press against the outer surface of the heated portion of the glass product or intermediate glass product, and other structural elements 93, 94 and 95, all of which may be combined by screws 96. The ring 92 comprises or is made of glassy carbon. Other components of the tool 90 may or may not contain glassy carbon. The carrier 91, for example, may be made of steel or graphite.

FIGS. 10D and 10E respectively illustrate an exploded view and a perspective view of another example of the tool according to the third embodiment. The tool 100 includes a carrier 101, a ring 102 and a nut 103. The ring 102 is made of glassy carbon, and is configured to couple to the carrier 101 and to press against the outer surface of the heated portion of a glass product or an intermediate glass product. As can be seen from FIG. 10D, the ring 102 may be composed of a first sub-ring 102a, a second sub-ring 102b and a third sub-ring 102*c* concentrically stacked together. The second sub-ring 102*b* is disposed between the first sub-ring 102*a* and the third sub-ring 102*c*, and the outermost diameter of the second sub-ring 102*b* is greater than the outermost diameter of the first sub-ring 102*a* and the outermost diameter of the third sub-ring 102*c*. That is, the side surface of the ring 102 is not flat but composed of several segments that, together, provide a desired profile for, e.g., the neck portion of a glass container.

FIG. 10F illustrates yet another example of the tool according to the third embodiment. The tool 109 includes a carrier 104, a nut 105 and a ring 106. The ring 106 is made of glassy carbon, and is configured to press against the outer surface of the heated portion of a glass product or an intermediate glass product. The other components of the tool 109 do not necessarily contain glassy carbon. For example, the carrier 104 may be made of steel, while the nut 105 may be made of graphite.

FIG. 11 illustrates a schematic view of a tool in contact with a glass product or an intermediate glass product according to a fourth embodiment of the present invention. As shown in FIG. 11, in the present case, the glass product to be made may be a syringe, and the intermediate glass product thereof may be a glass tube. Before being contacted with the tool 110, the intermediate glass product (glass tube) 118 may have a diameter D1 along its length, except that a syringe head 119 may already be formed at one end of the glass tube 118.

The tool 110 includes a pin 112 having a tapered end 114. The pin 112 comprises or is made of glassy carbon and is held, e.g., by bearings 116. A side surface of the tapered end 114 of the pin 112 is configured to press against a heated portion 117 of the glass tube 118. While the original diameter of the glass tube 118 at the heated portion 117 is D1, the heated portion 117 is deformed upon the press of the pin 112 such that the diameter of the glass tube 118 at the heated portion 117 is increased from the D1 to a diameter D2, thus forming the opposite end of the syringe.

In some embodiments, the tool used in the present invention may be a mold configured to accommodate the glass product or intermediate glass product.

For example, FIG. 12 illustrates an exploded view of a tool (i.e. a mold) for accommodating and shaping a glass product or an intermediate glass product according to a fifth embodiment of the present invention. In the present case, the tool 120 is configured to form a syringe head. The tool 120 includes a first mold portion 122 and a second mold portion 124 configured to be coupled to each other to form a mold cavity 121 which corresponds to an outer shape of the syringe head. The first mold portion 122 and the second mold portion 124 may be identical to each other. Therefore, the structure at the hidden side of the second mold portion 124 may be understood by observing the first mold portion 122 as the counterpart. A first partial opening 123 is formed in the first mold portion 122 and a second partial opening (not shown) is formed in the second mold portion 124 such that when the first mold portion 122 and the second mold portion 124 are coupled to each other, the first partial opening 123 and the second partial opening are coupled to each other to form a through hole communicating the mold cavity 121. The tool 120 further includes a pin 128 configured to be inserted, via the through hole 123, into the mold cavity 121, thereby forming a hole at the front end of the syringe head. Each of the first mold portion 122, the second mold portion 124 and the pin 128 may comprise or be made of glassy carbon.

Figure 13B:
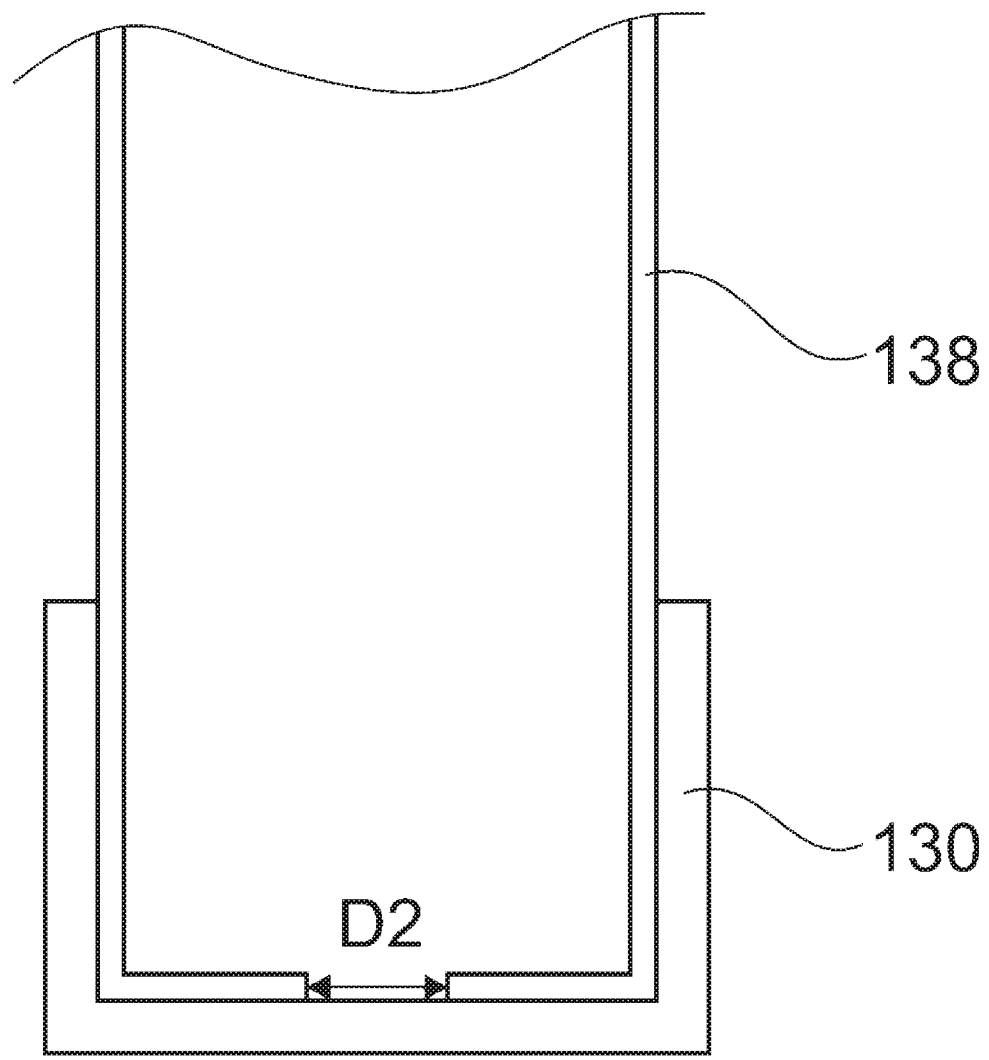
FIG. 13B illustrates a schematic view of a method of manufacturing a glass product according to a sixth embodiment of the present invention.

FIGS. 13A and 13B illustrate schematic views of a method of manufacturing a glass product according to a sixth embodiment. In the present embodiment, the tool 130 is a mold made of or comprising glassy carbon, and the glass product or intermediate glass product is a glass tube 138. The glass tube 138 has an opening at the end that is to be contacted with the tool 130. As shown in FIG. 13A, the opening has a diameter D1. During the manufacture of the glass product, the glass tube 138 is heated at the open end, and is brought into contact with the bottom surface 131 of the tool 130. A force is exerted to either the tool 130 or the glass tube 138 so that the bottom surface 131 of the tool 130 presses against and deform the glass tube 138, forcing the glass material of the heated portion of the glass tube 138 to accumulate on the bottom surface 131, so as to decrease the diameter of the opening from D1 to D2, as shown in FIG. 13B. This process may continue so as to completely close the opening, i.e. D2 may be 0.

It is also contemplated that any feature described above in particular reference to an embodiment, an example or a drawing can be combined with features described elsewhere, unless indicated otherwise. For example, the step 63 (FIG. 7) or the slope 73 (FIG. 8A) can be formed on the first forming element 42 (FIGS. 4-5); the air conduits of the first embodiment (FIGS. 2 and 3B) may be provided in the tool of the second embodiment.

In other aspects of the present invention, a tool and an apparatus for manufacturing a glass container, as well as a glass product are also contemplated. Specifically, the present invention also provides a tool that can be used for a method of manufacturing a glass product, said method including providing a glass product or an intermediate glass product, heating a portion of the glass product or intermediate glass product to a predetermined temperature, contacting a tool and the glass product or intermediate glass product and rotating at least one of the tool and the glass product or intermediate glass product under a state that the tool contacts the heated portion so that the tool and the glass product or intermediate glass product relatively rotate, and a part of this tool that contacts the heated portion is made of glassy carbon. The tool may be, for example, any one of the tools described with reference to FIGS. 1 to 13B. The present invention also provides an apparatus for manufacturing a glass product. The apparatus includes a tool with which a heated portion of a glass product or an intermediate glass product is to be contacted, and a means for contacting the tool with the heated portion and rotating at least one of the tool and the glass product or intermediate glass product so that the tool and the glass product or intermediate glass product relatively rotate, wherein a part of the tool that contacts the heated portion is made of glassy carbon. The present invention also provides a glass product manufactured by the above method.

INDUSTRIAL APPLICABILITY

According to the present invention, a surface, either of the bottom part or of the neck of a glass container, can be produced with, for example, better light reflectivity and without undergoing complex steps.

The invention claimed is:

1. A tool for use in a method of manufacturing a vial, the tool comprising:
   a carrier;
   a coupling nut surrounding the carrier, wherein the carrier and the coupling nut are configured to rotate about a central axis; and a plate on the carrier and within the nut so as to be rotated with the carrier and the coupling nut, the plate having a contact surface for contacting a heated portion of the vial, the contact surface comprising glassy carbon.

2. The tool of claim 1, wherein the contact surface of the plate and the heated portion at a closed end of the vial are to be pressed against each other.

3. The tool of claim 2, wherein the contact surface of the plate has a surface roughness in a range of 0.4 μm to 1.8 μm calculated based on five highest peaks and five lowest valleys over an entire sampling length.

4. The tool of claim 2, wherein at least one of the tool and a holder of the vial is configured to rotate at a relative rotational speed in a range of from 100 min$^{-1}$ to 500 min$^{-1}$.

5. The tool of claim 2, wherein the part of the tool comprising glassy carbon has a Vickers Hardness in a range of 230 HV to 250 HV.

6. The tool of claim 2, wherein the vial is a medical glass vial.

7. The tool of claim 1, wherein the contact surface of the plate has a surface roughness in a range of 0.4 μm to 1.8 μm calculated based on five highest peaks and five lowest valleys over an entire sampling length.

8. The tool of claim 1, wherein at least one of the tool and a holder of the vial is configured to rotate at a relative rotational speed in a range of from 100 min$^{-1}$ to 500 min$^{-1}$.

9. The tool of claim 1, wherein the part of the tool comprising glassy carbon has a Vickers Hardness in a range of 230 HV to 250 HV.

10. The tool of claim 1, wherein the plate has a convex shape.

11. The tool of claim 1, wherein the carrier is threaded into the nut.

12. The tool of claim 1, wherein the carrier has an air inlet and a plurality of air outlets surrounding and communicating with the air inlet, the air inlet and the air outlets being configured to allow cooling air to flow into the air inlet, contact the plate, and flow out of the air outlets.

13. The tool of claim 1, wherein the plate comprises a graphite substrate and a coating of glassy carbon on the graphite substrate forming the contact surface of the plate.

* * * * *